United States Patent
Ichimaru et al.

[11] Patent Number: 5,968,102
[45] Date of Patent: Oct. 19, 1999

[54] SUSPENSION CONTROL APPARATUS

[75] Inventors: Nobuyuki Ichimaru, Kanagawa-ken; Hiroshi Sakai, Tokyo; Masaaki Uchiyama, Sakura, all of Japan

[73] Assignee: Tokico Ltd., Kanagawa-ken, Japan

[21] Appl. No.: 08/818,681

[22] Filed: Mar. 14, 1997

[30] Foreign Application Priority Data

Mar. 19, 1996 [JP] Japan .................................. 8-090152
Jan. 13, 1997 [JP] Japan .................................. 9-015927

[51] Int. Cl.$^6$ .................................................. G06F 17/00
[52] U.S. Cl. ........................ 701/37; 701/48; 280/5.5; 280/5.501
[58] Field of Search ................... 701/37, 38, 48; 280/5.5, 5.501; 188/318, 322.13; 364/528.17

[56] References Cited

U.S. PATENT DOCUMENTS

| | | | |
|---|---|---|---|
| 5,048,861 | 9/1991 | Takahashi | 280/5.501 |
| 5,202,813 | 4/1993 | Uota et al. | 361/154 |
| 5,400,245 | 3/1995 | Butsuen et al. | 701/37 |
| 5,619,413 | 4/1997 | Oakley | 701/37 |
| 5,701,245 | 12/1997 | Ogawa et al. | 701/37 |

FOREIGN PATENT DOCUMENTS

| | | |
|---|---|---|
| 61-102304 | 5/1986 | Japan . |
| 63-43079 | 2/1988 | Japan . |
| 63-43080 | 2/1988 | Japan . |
| 2-182515 | 7/1990 | Japan . |

*Primary Examiner*—William A. Cuchlinski, Jr.
*Assistant Examiner*—Gertrude Arthur
*Attorney, Agent, or Firm*—Wenderoth, Lind & Ponack, L.L.P.

[57] ABSTRACT

The present invention provides a suspension control apparatus which can perform good suspension control regardless of change in temperature. The suspension control apparatus comprises a transistor capable of being turned ON/OFF in response to a level of a PWM signal, a current sensor for detecting current flowing through a proportional solenoid, and a controller for adjusting a duty ratio of the PWM signal on the basis of the comparison between a current data detected by the current detecting means and a previously set reference data to correct command current. The current actually flowing through the proportional solenoid is measured, and the duty ratio of the PWM signal is adjusted to obtain a desired damping force on the basis of the measured current. With this arrangement, if a temperature of the proportional solenoid is increased to increase resistance thereof due to application of current to the proportional solenoid, the applied current is corrected to provide the desired damping force.

11 Claims, 21 Drawing Sheets

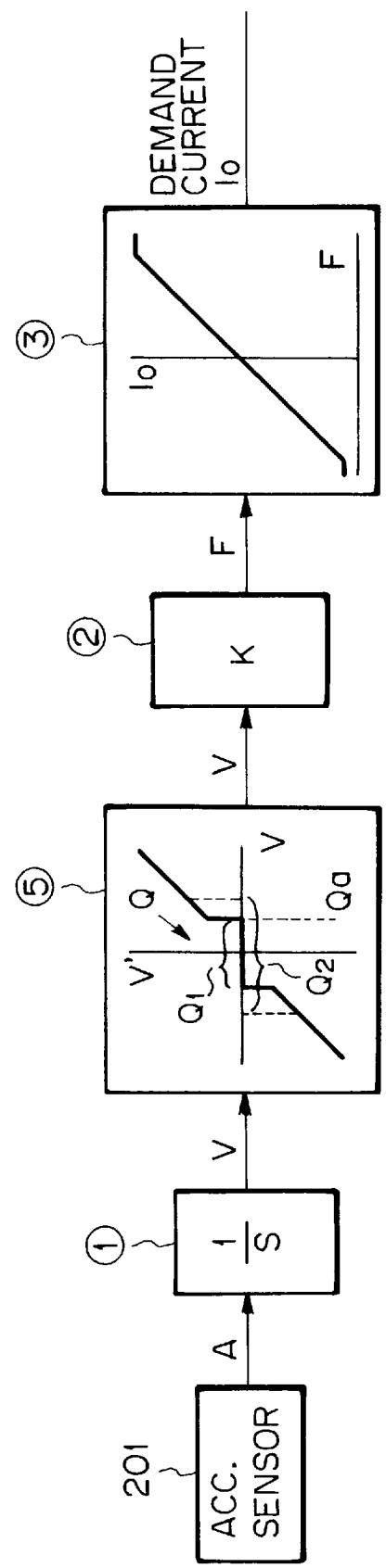

SUSPENSION CONTROL APPARATUS

BACKGROUND OF THE INVENTION

The present invention relates to a suspension control apparatus used in vehicles.

An example of a suspension control apparatus is described in the Japanese Patent Application No. 7-135854 (1995). Such a suspension control apparatus comprises a proportional solenoid valve including a solenoid and a movable member capable of shifting in proportion to current applied to the solenoid and adapted to adjust an amount of hydraulic fluid or oil (passed through the valve) in response to the displacement of the movable member, and a suspension body disposed between a body or a chassis of a vehicle and a vehicle wheel for expansion and compression and which is capable of being expanded or compressed in response to the operation of the solenoid valve. In this apparatus, the current applied to the solenoid is adjusted by using a PWM (pulse width modulated) signal, so that a plunger of the proportional solenoid valve is positioned to provide a desired damping force. In this case, by changing a duty ratio of the PWM signal, a dither component is included in the current applied to the solenoid to afford minute vibration (dither) to the plunger, thereby facilitating the displacement of the plunger to ensure good response of the suspension control.

In the conventional technique described in the above Japanese Patent Application No. 7-135854, an amount of the current applied to the solenoid is determined by assuming that a resistance value of the solenoid of the proportional solenoid valve is constant regardless of change in temperature. Thus, due to the change in temperature during use or a difference between a set temperature and a temperature in use, the resistance value of the solenoid of the proportional solenoid valve changes to cause a difference between a desired current value (target value) to be applied to the solenoid and a current value (actual current value) actually flowing through the solenoid, with the result that there is a danger of deviation of a damping force obtained (and, accordingly, a vehicle height value) from a desired value. Such a disadvantage may also be caused by fluctuation in voltage of a battery.

BRIEF SUMMARY OF THE INVENTION

The present invention aims to eliminate the above-mentioned conventional drawback, and an object of the present invention is to provide a suspension control apparatus which can achieve good suspension control regardless of a change in temperature and/or fluctuation of battery voltage.

To achieve the above object, according to the present invention, there is provided a suspension control apparatus comprising an actuator having a solenoid and a movable member capable of shifting in proportion to current applied to the solenoid and adapted to adjust an amount of fluid (passed through the actuator) in response to the displacement of the movable member. The suspension control apparatus also includes a current supply circuit for supplying current to the actuator, and a shock absorber disposed between a vehicle body and a vehicle axle for expansion and compression which is adapted to adjust a magnitude of a damping force or an amount of expansion and compression in response to an operation of the actuator. In the apparatus of the invention, the current supply circuit comprises a power source connected to the solenoid, a PWM signal generating circuit of a variable duty ratio type for outputting a PWM signal to the actuator, a switch incorporated in a closed circuit including the solenoid and the power surface and capable of being opened or closed in response to a level of the PWM signal, a current detector for detecting current flowing through the solenoid, and a controller for adjusting the duty ratio of the PWM signal on the basis of the comparison between a current data detected by the current detecting means detector and a previously set reference data to correct the current flowing through the solenoid.

With this arrangement, the current actually flowing through the solenoid is measured, and, on the basis of the comparison between the measured current data and the previously set reference data, the current flowing through the solenoid is adjusted to obtain a desired damping force.

In this case, the controller may be designed so that it causes the PWM signal generating circuit to output the PWM signal having 100% duty ratio, when the current detector detects the current. Alternatively, the controller may be designed so as to correct the current after the current flowing through the solenoid becomes constant. Further, the controller may be designed so that, when a command current is in a control dead zone where the magnitude of the command current to be supplied to the solenoid is smaller than a previously set predetermined value, the magnitude of the command current is corrected to a reference value, and, when the correction is not effected for a predetermined time period, a range of the control dead zone is increased.

BRIEF DESCRIPTION OF THE SEVERAL VIEWS OF THE DRAWINGS

FIG. 25 is a block diagram showing a portion of control steps of the controller of the suspension control apparatus according to the sixth embodiment.

DETAILED DESCRIPTION OF THE INVENTION

Now, a suspension control apparatus according to a first embodiment of the present invention will be explained with reference to FIGS. 1 to 9.

Figure 1:
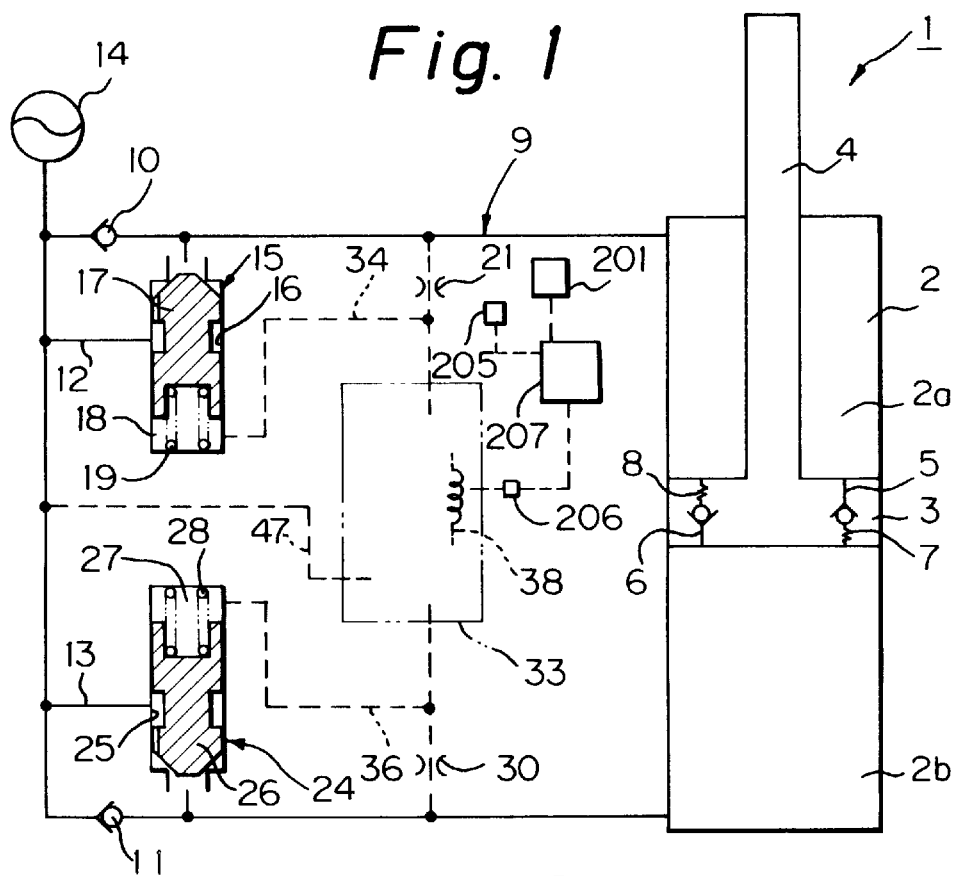
FIG. 1 is a schematic illustration showing a suspension control apparatus according to a first embodiment of the present invention.

As shown in FIG. 1, a shock absorber 1 includes a piston 3 slidably mounted within a cylinder 2 in which hydraulic fluid or oil is contained. The interior of the cylinder 2 is separated into two sections by the piston 3 to define an upper cylinder chamber 2a and a lower cylinder chamber 2b. The piston 3 is connected to one end of a piston rod 4 the other end of which extends out of the cylinder 2 through a rod guide and a seal (both not shown) provided on an end of the cylinder 2. The other end of the piston rod 4 is secured to a vehicle body or chassis (not shown) and the cylinder 2 is secured to a vehicle axle (not shown) so that the shock absorber 1 is disposed between the vehicle chassis and the vehicle axle. Although four shock absorbers 1 are provided for four corresponding wheels of the vehicle, respectively, only one shock absorber is shown in FIG. 1 for simple illustration.

The piston 3 is provided with an extension side passage 5 and a compression side passage 6 which communicate the upper and lower cylinder chambers 2a and 2b with each other. The extension side passage 5 is provided with a pressure regulating valve 7 such as a disc valve for permitting the hydraulic fluid to flow from the upper cylinder chamber 2a to the lower cylinder chamber 2b to generate a damping force when pressure in the upper cylinder chamber 2a exceeds a predetermined pressure value, and the compression side passage 6 is also provided with a pressure regulating valve 8 such as a disc valve for permitting the hydraulic fluid to flow from the lower cylinder chamber 2b to the upper cylinder chamber 2a to generate a damping force when pressure in the lower cylinder chamber 2b exceeds a predetermined pressure value.

A communication passage 9 disposed outside the cylinder 2 serves to communicate the upper and lower cylinder chambers 2a and 2b with each other. The communication passage 9 includes a check valve 10 for preventing the oil flow from the upper cylinder chamber 2a to the lower cylinder chamber 2b, and a check valve 11 for preventing the oil flow from the lower cylinder chamber 2b to the upper cylinder chamber 2a. The communication passage 9 further includes an extension side communication passage 12 bypassing the check valve 10, and a compression side communication passage 13 bypassing the check valve 11. The communication passage 9 is connected to a reservoir (accumulator) 14 for compensating for change in volume of the cylinder 2 due to extension and retraction of the piston rod 4 by expansion or compression of gas.

The expansion side communication passage 12 includes a poppet valve 15 for adjusting a flow area of the passage. The poppet valve 15 is constituted by a poppet (poppet body) 17 slidably mounted within a guide 16 so that the flow area of the expansion side communication passage 12 is adjusted by shifting the poppet 17. The poppet 17 is shifted to a valve open position when it is subjected to pressure in an upstream passage portion (upper cylinder chamber 2a side) of the expansion side communication passage 12. A back pressure chamber 18 is provided on a back surface of the poppet 17 in the guide 16. A spring 19 for biasing the poppet 17 toward a valve close position is disposed within the back pressure chamber 18.

Similarly, the compression side communication passage 13 includes a poppet valve 24 for adjusting a flow area of the passage. The poppet valve 24 is constituted by a poppet (poppet body) 26 slidably mounted within a guide 25 so that the flow area of the compression side communication passage 13 is adjusted by shifting the poppet 26. The poppet 26 is shifted to a valve open position when it is subjected to pressure in an upstream passage portion (lower cylinder chamber 2b side) of the compression side communication passage 13. A back pressure chamber 27 is provided on a back surface of the poppet 26 in the guide 25. A spring 28 for biasing the poppet 26 toward a valve close position is disposed within the back pressure chamber 27.

Figure 2:
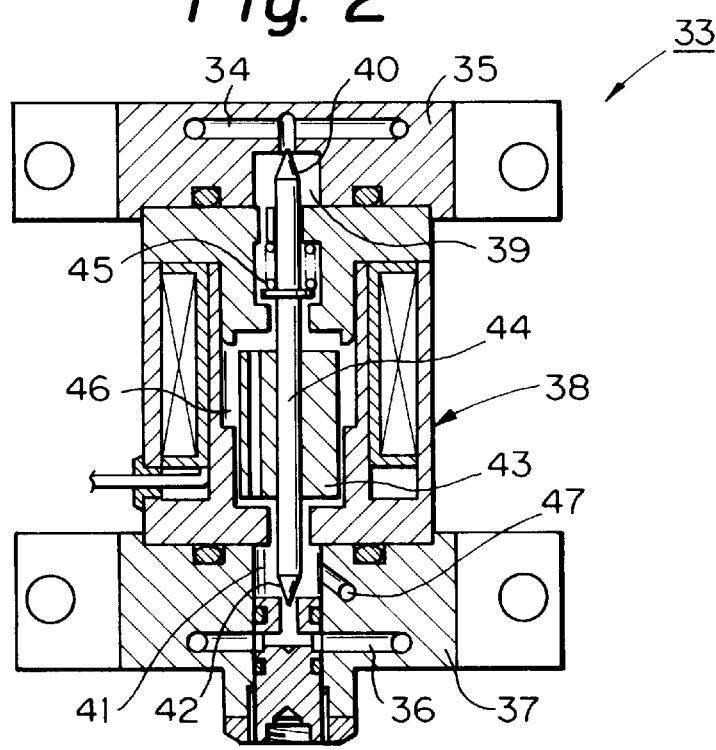
FIG. 2 is a sectional front view showing an electromagnetic proportional control valve of the suspension control apparatus of FIG. 1.

An electromagnetic proportional control valve (actuator) 33 as shown in FIG. 2 is connected to the back pressure chamber 18 of the poppet valve 15 and the back pressure chamber 27 of the poppet valve 24. A back pressure passage 34 formed in a relief valve 35 of the electromagnetic proportional control valve 33 is communicated with the back pressure chamber 18, and a back pressure passage 36 formed in a relief valve 37 of the electromagnetic proportional control valve 33 is communicated with the back pressure chamber 27. An intermediate portion of the back pressure passage 34 is connected to the communication passage 9 through an orifice 21, and an intermediate portion of the back pressure passage 36 is connected to the communication passage 9 through an orifice 30.

As shown in FIG. 2, the electromagnetic proportional control valve 33 comprises the above-mentioned relief valve 35 for relieving the back pressure passage 34 connected to the poppet valve 15, the above-mentioned relief valve 37 for relieving the back pressure passage 36 connected to the poppet valve 24, and a proportional solenoid 38 for opening/closing the relief valves 35, 37.

The relief valve 35 is a needle valve for opening/closing a communication port between the back pressure passage 34 and a relief chamber 39 by a needle 40, and, similarly, the relief valve 37 is a needle valve for opening/closing a communication port between the back pressure passage 36 and a relief chamber 41 by a needle 42. The needles 40, 42 are provided on both ends of a rod 44 connected to a plunger 43 of the proportional solenoid 38 so that, when one of the relief valves 35, 37 is closed by shifting the rod 44, the other relief valve is opened.

The proportional solenoid 38 is provided with a spring 45 for biasing the rod 44 toward the relief valve 37. The proportional solenoid 38 serves to generate a force for shifting the rod 44 toward the relief valve 35 via the plunger 43 against a biasing force of the spring 45 in response to current applied to the solenoid. Relief pressure of the relief valve 37 is adjusted depending on the current applied to the solenoid, and, relief pressure of the relief valve 35 is adjusted by shifting the rod 44 toward the relief valve 35 by increasing the applied current.

The relief chambers 39, 41 communicate with each other through a relief passage 46 formed in the proportional solenoid 38 and are also communicated with the reservoir 14 through a relief passage 47 formed in the relief valve 37.

The relief pressure of the relief valve 35 can freely be set by the operation of the proportional solenoid 38, and the relieved hydraulic fluid is sent to a downstream side of the poppet valve 15 of the extension side communication passage 12 through the relief passage 47 (described later). Further, the pressure of the hydraulic fluid flowing into the back pressure passage 34 can be reduced by means of the orifice 21, thereby reducing the load acting on the relief valve 35.

Similarly, the relief pressure of the relief valve 37 can freely be set by the operation of the proportional solenoid 38, and the relieved hydraulic fluid is sent to a downstream side (reservoir 14 side) of the poppet valve 24 of the compression side communication passage 13 through the relief passage 47. Further, the pressure of the hydraulic fluid flowing into the back pressure passage 36 can be reduced by means of the orifice 30, thereby reducing the load acting on the relief valve 37.

During the retraction stroke of the piston rod 4, the hydraulic fluid in the lower cylinder chamber 2b flows into the upper cylinder chamber 2a through the communication passage 9 by the sliding movement of the piston 3. During this operation, since the check valve 10 is opened and the check valve 11 is closed, the damping force is generated by the poppet valve 24 because the hydraulic fluid flows through the compression side communication passage 13.

In the poppet valve 24, the poppet 26 tends to shift toward the valve open position due to the presence of pressure in the lower cylinder chamber 2b. On the other hand, the pressure in the lower cylinder chamber 2b acts on the back pressure chamber 27 through the back pressure passage 36, thereby tending to shift the poppet 26 toward the valve close position, and the biasing force of the spring 28 also acts to shift the poppet 26 toward the valve close position. When the pressure in the back pressure chamber 27 exceeds the set pressure of the relief valve 37, the relief valve 37 is opened to flow the hydraulic fluid in the back pressure passage 36 into the upper cylinder chamber 2a through the relief passage 47. Thus, the pressure in the back pressure chamber 27 can be set by the relief valve 37, and, accordingly, by the proportional solenoid 38. The poppet 26 is shifted to a position where the pressure in the lower cylinder chamber 2b is balanced to the set pressure of the relief valve 37 and the biasing force of the spring 28. Accordingly, the poppet valve 24 is opened at an opening degree proportional to the current applied to the proportional solenoid 38, thereby determining the damping force.

During the extension stroke of the piston rod 4, the hydraulic fluid in the upper cylinder chamber 2a flows into the lower cylinder chamber 2b through the communication passage 9 by the sliding movement of the piston 3. In this case, since the check valve 10 is closed and the check valve 11 is opened, the damping force is generated by the poppet valve 15 because the hydraulic fluid flows through the expansion side communication passage 12.

In the poppet valve 15, the poppet 17 tends to shift toward the valve open position due to the presence of pressure in the upper cylinder chamber 2a. On the other hand, the pressure in the upper cylinder chamber 2a acts on the back pressure chamber 18 through the back pressure passage 34, thereby tending to shift the poppet 17 toward the valve close position, and the biasing force of the spring 19 also acts to shift the poppet 17 toward the valve close position. When the pressure in the back pressure chamber 18 exceeds the set pressure of the relief valve 35, the relief valve 35 is opened to flow the hydraulic fluid in the back pressure passage 34 into the lower cylinder chamber 2b through the relief passage 47. Thus the pressure in the back pressure chamber 18 can be set by the relief valve 35, and, accordingly, by the proportional solenoid 38. The poppet 17 is shifted to a position where the pressure in the upper cylinder chamber 2a is balanced to the set pressure of the relief valve 35 and the biasing force of the spring 19. Accordingly, the poppet valve 15 is opened at an opening degree proportional to the current applied to the proportional solenoid 38, thereby determining the damping force.

As mentioned above, by adjusting the relief pressure of the relief valve 37 by applying the current to the proportional solenoid 38, the opening degree of the poppet valve 24 can be adjusted, thereby controlling the damping force at the compression side. In this case, since the relief valve 35 is in the open position, the opening degree of the poppet valve 15 becomes greater to decrease the damping force for the expansion side. Accordingly, the damping force feature scribes curves ① in FIG. 4. Incidentally, the curves ① show a case where the current I applied to the proportional solenoid 38 is minimized to maximize the damping force for the compression side.

By adjusting the relief pressure of the relief valve 35 by shifting the rod 44 toward the relief valve 35 by increasing the current I applied to the proportional solenoid 38, the opening degree of the poppet valve 15 can be adjusted, thereby controlling the damping force for the expansion side. In this case, since the relief valve 37 is in the open position, the opening degree of the poppet valve 24 becomes greater to decrease the damping force for the compression side. Accordingly, the damping force feature scribes curves ② in FIG. 4. Incidentally, the curves ② show a case where the current I applied to the proportional solenoid 38 is maximized to maximize the damping force for the expansion side.

In this way, by adjusting the current I applied to the proportional solenoid 38, the damping force feature can be adjusted continuously between the curves ① and the curves ②.

Figure 3:
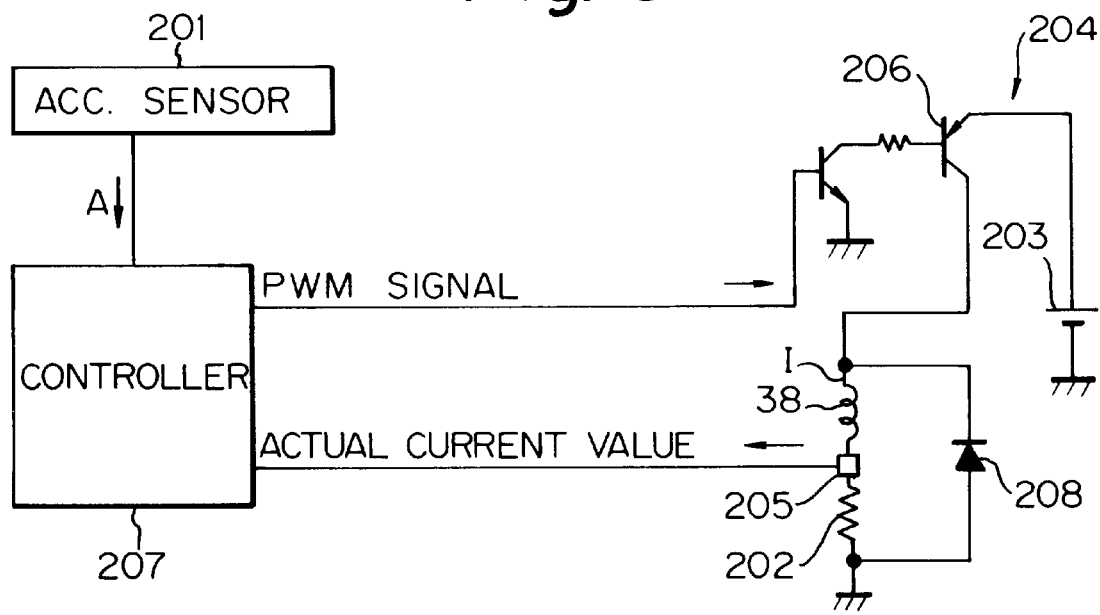
FIG. 3 is a circuit diagram showing a connection between a controller and a proportional solenoid of the suspension control apparatus of FIG. 1.
Figure 4:
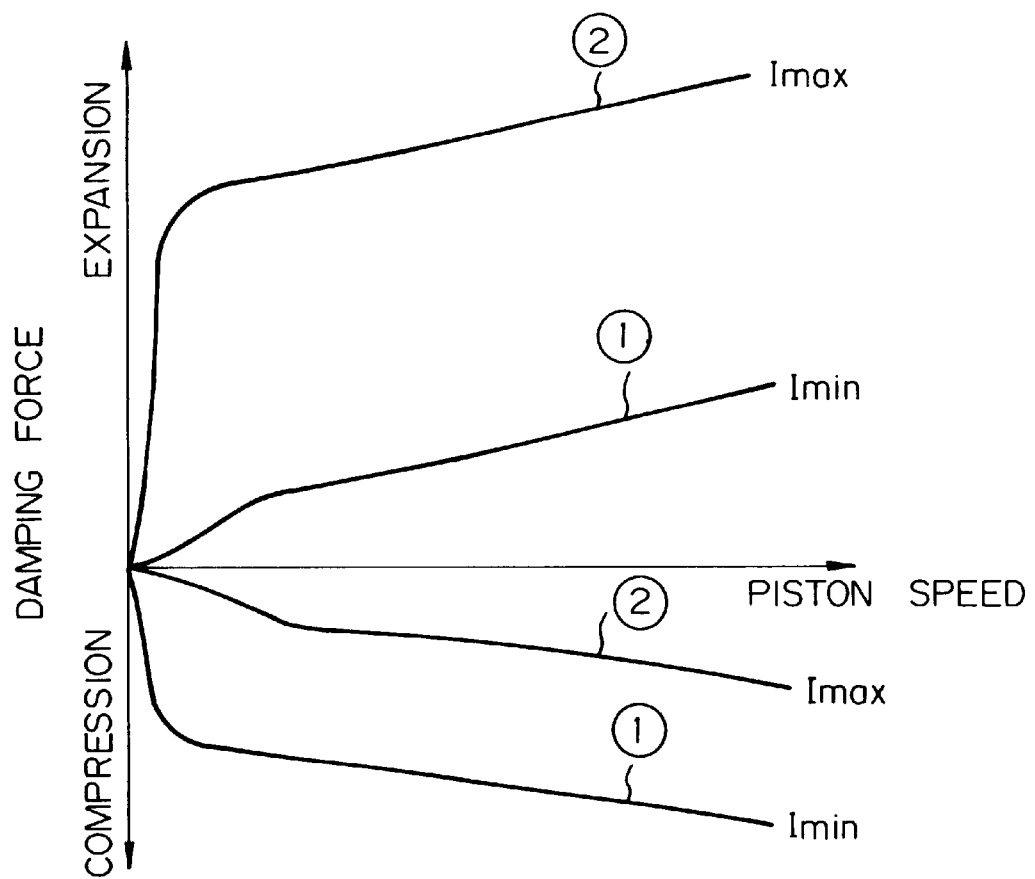
FIG. 4 is a graph showing a damping feature of a shock absorber of the suspension control apparatus of FIG. 1.

The suspension control apparatus further includes an acceleration sensor 201 for detecting acceleration of a vehicle body in an up-and-down direction and for outputting the detected value as an acceleration signal A. As shown in FIG. 3, the proportional solenoid 38 is connected to a power source 203 via a shunt resistor 202, and a closed circuit 204 is constituted by the proportional solenoid 38, shunt resistor 202 and power source 203. The proportional solenoid 38 serves to generate an electromagnetic force having a magnitude in proportion to the applied current I regulated by ON/OFF of a transistor 206 (described later), thereby shifting the plunger 43. In this case, the applied current I consists of demand current $I_0$ and dither current Iz which will be described later, so that the plunger 43 is positioned at a position corresponding to the demand current $I_0$ and is subjected to minute vibration (dither) in response to the dither current Iz, thereby facilitating the displacement of the plunger 43, and, accordingly, improving the response to adjustment of the damping force. The closed circuit 204 includes a current sensor (current detecting means) 205 for detecting the current flowing through the proportional solenoid 38, and a transistor (switching means) 206 for controlling ON/OFF of the closed circuit 204. In FIG. 3, the reference numeral 208 denotes a diode. Incidentally, in place of the current sensor 205 for detecting the current flowing through the proportional solenoid 38, the current detecting means may be a means for measuring voltage between both ends of the shunt resistance 202 by a voltmeter and for determining the current flowing through the proportional solenoid 38 by dividing the measured voltage value by the resistance value of the shunt resistance 202.

The transistor 206 receives a PWM signal having, for example, 10 KHz so that the transistor is turned ON at a high level of the PWM signal and is turned OFF at a low level of the PWM signal, and is so designed that, by changing the duty ratio of the PWM signal, an average value of the current I applied to the proportional solenoid 38 can be adjusted and the dither current Iz can be included into the applied current I. In this case, the applied current I is constituted by the demand current $I_0$ having a magnitude corresponding to the position of the plunger 43, and the dither current Iz. By adding the dither current Iz to the applied current I, the plunger 43 is subjected to the minute vibration as mentioned above, thereby facilitating the displacement of the plunger 43, and, accordingly, improving the response to the damping force adjustment (suspension control).

Now, the fact that the dither current Iz is included in the applied current I by changing the duty ratio of the PWM signal will be explained in more detail. For example, as shown in a left part of FIG. 9, it is assumed that the duty ratios of the PWM signal are 20%, 10% and 20% in a time range a–b (for example, 3 ms.), a time range b–c (for example, 3 ms.) and a time range c–d (for example, 3 ms.), respectively. In this case, when the PWM signal is supplied to the transistor 206, the current value is gradually increased in the time range a–b, is gradually decreased in the time range b–c and is gradually increased in the time range c–d. Thus the applied current I is what is obtained by overlapping the dither current Iz with the demand current $I_0$ (demand current $I_{01}$). That is, the dither current Iz is included in the applied current I.

Figure 9:
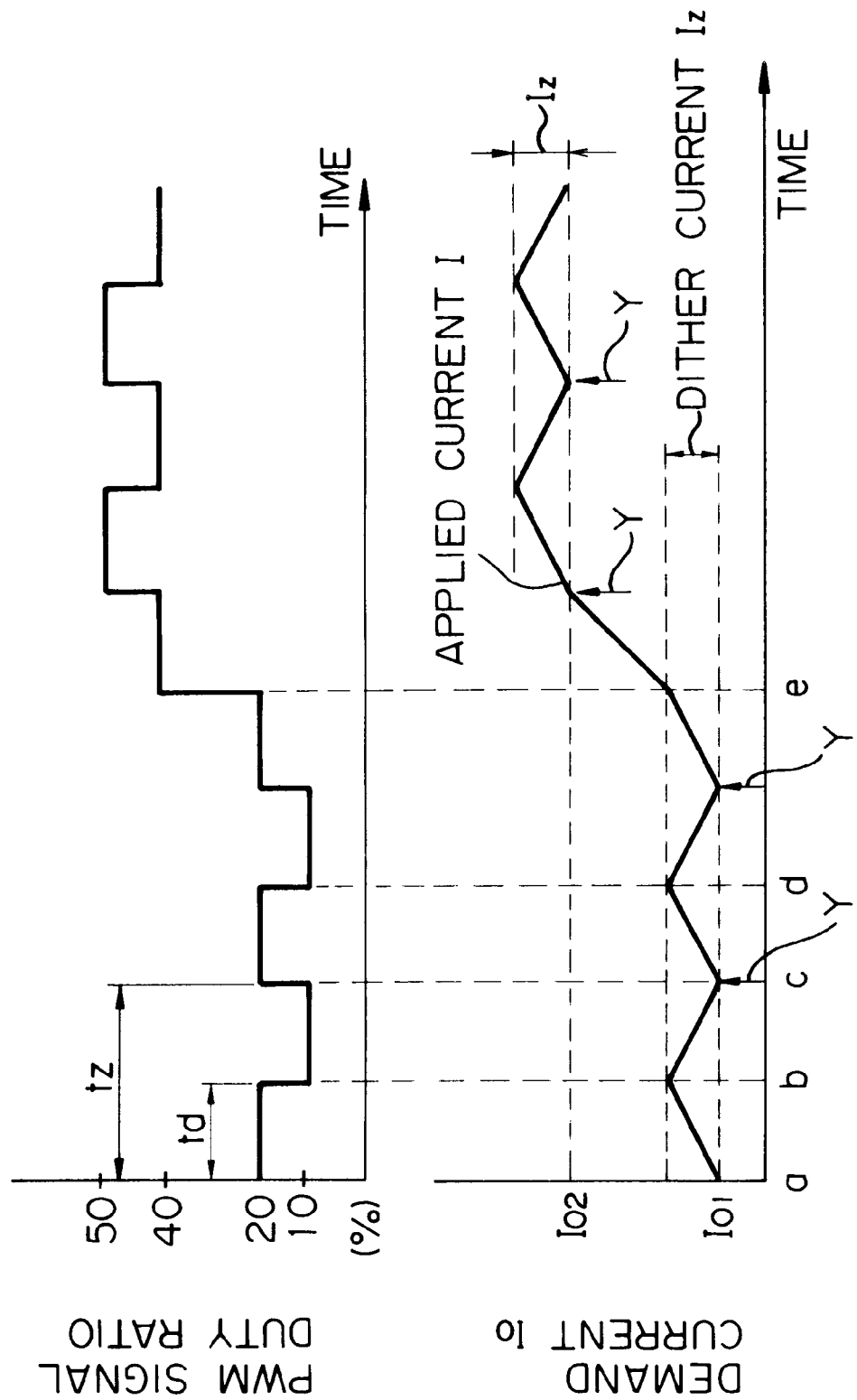
FIG. 9 is a graph showing a signal wave form and current for explaining the operation of the suspension control apparatus of FIG. 1.

Similarly, as shown in a right part of FIG. 9, when the duty ratio of the PWM signal is changed between 50% and 40% in the successive time ranges, the applied current I becomes what is obtained by overlapping the dither current Iz with the demand current $I_0$ (demand current $I_{02}$). That is, the dither current Iz is included in the applied current I.

Incidentally, in this case, as an ON time period of the transistor 206 is increased, the applied current I is also increased due to increase in the amount of the demand current.

In FIG. 9, the high and low levels of the PWM signal are inputted to the transistor 206 by several times in the time range a–b, with the result that the applied current I is generally gradually increased in the time range a–b while repeating increase and decrease. However, in FIG. 9, for simplifying the illustration, the applied current I is shown to be linearly gradually increased. This also applies to the other time ranges including the time range b–c.

As mentioned above, by changing the duty ratio of the PWM signal, the dither current Iz is included in the applied current I and the current having the magnitude proportional to the duty ratio of the PWM signal is applied to the proportional solenoid 38.

The suspension control apparatus further includes a controller (control means) 207 connected to the transistor 206, current sensor 205 proportional solenoid 38 and acceleration sensor 201. The controller 207 also acts as a PWM signal generating circuit for effecting a treatment which will be described later. In the illustrated embodiment, a current supply circuit is constituted by the power source 203, transistor 206 and controller 207.

A calculation treatment of the controller 207 will now be explained with reference to FIG. 5. When the main power is supplied to the controller 207, execution of control software of the controller 207 is started (step S1). In the next step S2, initialization is effected so that an initial calculation value for driving the proportional solenoid 38 in a step S4 (described later), an initial value of correction coefficient K1 and the like are firstly set. Then, it is judged whether a control period T [ms] has elapsed or not (step S3). In the step S3, if NO, it is again judged whether the control period T [ms] has elapsed. On the other hand, in the step S3, if YES, the PWM signal having the duty ratio determined in a step S8 (described later) is outputted to the transistor 206 to drive the proportional solenoid 38 (step S4). Following the step S4, signals are outputted to various elements such as an LED to control such elements (step S5).

Then, various sensor signals including a signal of the acceleration sensor 201 are inputted (step S6). Following the step S6, on the basis of the acceleration signal A from the acceleration sensor 201, a damping force required to suppress the vibration of the vehicle is determined, and the demand current $I_0$ for providing the applied current I required to generate the damping force (step S7) is also determined.

Figure 8:
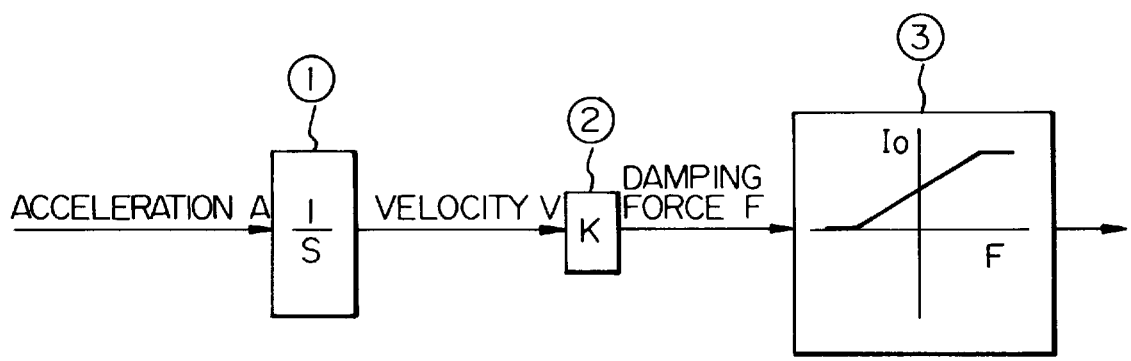
FIG. 8 is a block diagram showing a portion of control steps of the controller of the suspension control apparatus of FIG. 1.

The step S7 includes the processes shown in FIG. 8. Particularly, in a block ①, the velocity V of the vehicle in the up-and-down direction is calculated by integrating the acceleration signal A from the acceleration sensor 201, and, in a block ②, a target damping force F is calculated by multiplying the velocity V by a gain K, and, in a block ③, the demand current $I_0$ for providing the applied current I to be applied to the proportional solenoid 38 for establishing the target damping force F is determined.

Following the step S7, a current feedback sub-routine is executed (step S8).

The current feedback sub-routine will be described with reference to FIG. 6.

First of all, it is judged whether a correction judge period $t_d$ [ms] has elapsed or not (step S21). In this case, the correction judge period $t_d$ [ms] is set to ½ of a period $t_z$ (refer to FIG. 9) of the dither current Iz. In the step S21, if YES, the program goes to a step S22, where a dither flag is inverted. Then, in a step S23, it is judged whether the dither flag is 1 or not.

In the step S23, if NO (dither flag=0), the demand current $I_0$ determined in the step S7 is determined as a command current.

On the other hand, in the step S23, if YES (dither flag=1), the detection data of the current sensor 205 is A/D-converted to obtain the current (actual current) passing through the proportional solenoid 38 (step S25), and, then, the correction coefficient $K_1$ as reference data is calculated by dividing the command current value (demand current $I_0$) calculated in the previous calculation period by the actual current value (step S26). And, it is so treated: (command current)=(demand current $I_0$)+(dither current $I_z$)(step S27).

Following the step S27, a new command current value (final command current value) is determined by multiplying the correction coefficient $K_1$ determined in the step S26 by the command current value obtained in the step S27 (step S28), and, then, the duty ratio of the PWM signal is determined by multiplying the final command current value by a predetermined gain $K_2$ (a coefficient required to determine the duty ratio of the PWM signal from the current value)(step S29). Thereafter, the program is returned to the main routine shown in FIG. 5. Further, following the step S24, the steps S28 and S29 are executed, and, then, the program is returned to the main routine shown in FIG. 5.

In the step S28 when it follows the step S24, the calculation is also effected by using the correction coefficient K1 previously determined in the step S26.

Figure 5:
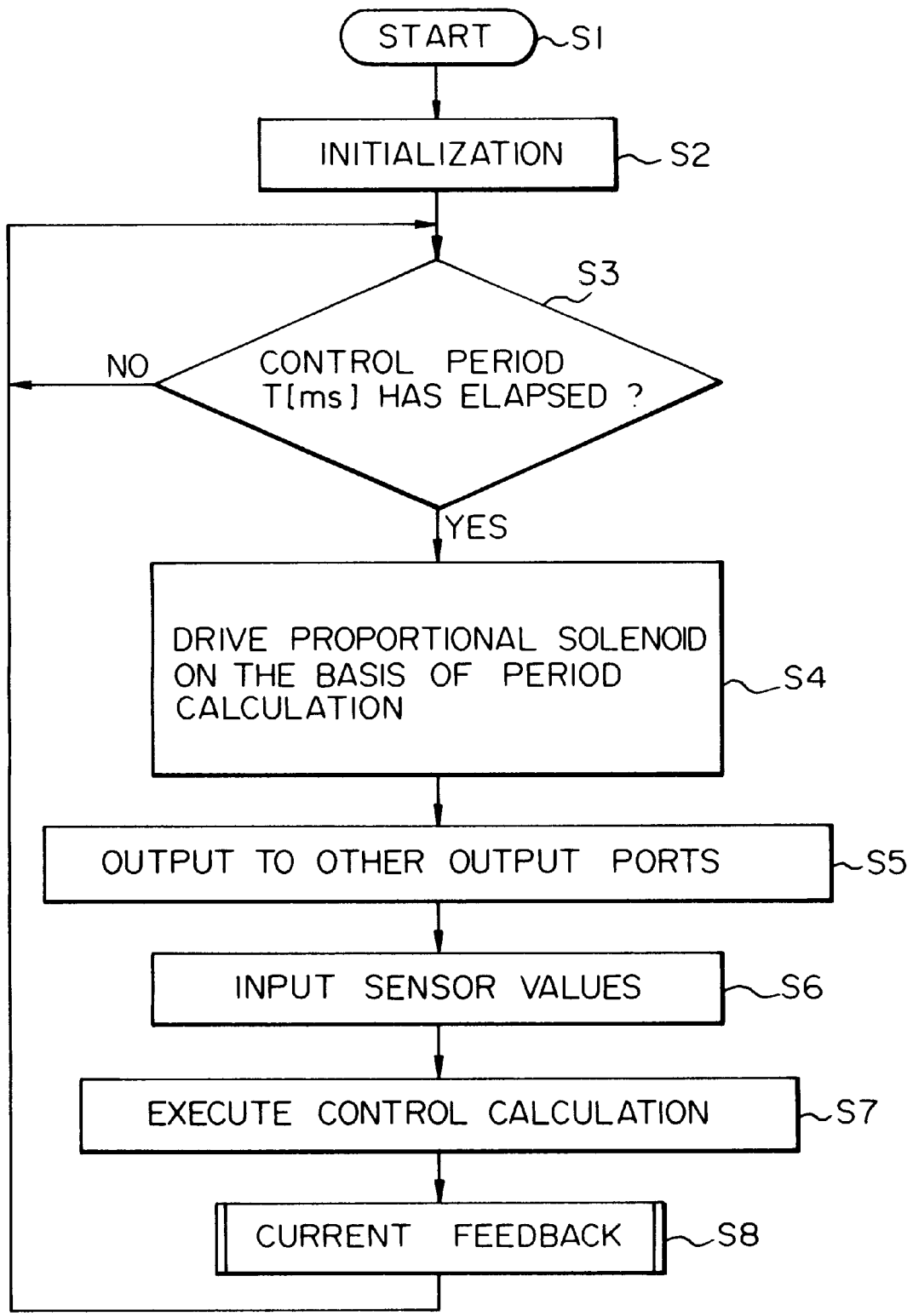
FIG. 5 is a flow chart for explaining an operation of the suspension control apparatus of FIG. 1.

In the step S21, if NO, the program is returned to the main routine shown in FIG. 5.

Incidentally, in place of the execution of the step S29, the controller 207 may previously store a map (design data) indicating a predetermined relation between the duty ratio and the command current value (as shown by the curve B1 in FIG. 7) so that the duty ratio can be determined from the map on the basis of the final command current value determined in the step S28.

Next, an operation of the suspension control apparatus having the above-mentioned arrangement will now be explained.

For example, when the vehicle is running, the damping force required to suppress the vibration of the vehicle is determined on the basis of the acceleration signal A from the acceleration sensor 201 and the demand current $I_0$ required to generate the damping force is determined (step S7).

On the other hand, after the correction judge period $t_d$ [ms] has elapsed, whenever the dither flag becomes one (1), i.e., whenever the period $t_z$ of the dither current $I_z$ (correction judge period $t_d \times 2$ [ms]) is reached as shown by arrows Y in FIG. 9, the correction coefficient $K_1$ is calculated on the basis of the command current calculated in the previous calculation period in the step S24 and the detection data from the current sensor 205 (step S26), and the new command current value (final command current value) is determined (step S28). Then, the duty ratio is determined on the basis of the command current value (final command current value) determined in the step S28, and the PWM signal having such duty ratio is supplied to the transistor 206 to apply the applied current I to the proportional solenoid 38, thereby shifting the plunger 43 to obtain the desired damping force.

As mentioned above, the current actually flowing through the proportional solenoid 38 is detected, the correction coefficient $K_1$ is determined on the basis of the measured current value, and the command current is corrected to obtain the desired damping force. Thus, even if the temperature of the proportional solenoid 38 is increased to increase the resistance value thereof due to the application of the current to the proportional solenoid 38, since the duty ratio of the PWM signal is adjusted to correct the current I flowing through the proportional solenoid 38, the desired damping force can be obtained, high accurate damping force adjustment (suspension control) can be performed, and the riding comfort and steering stability can be improved.

Next, a suspension control apparatus according to a second embodiment of the present invention will be explained with reference to FIGS. 10 to 12 and FIG. 3.

Figure 10:
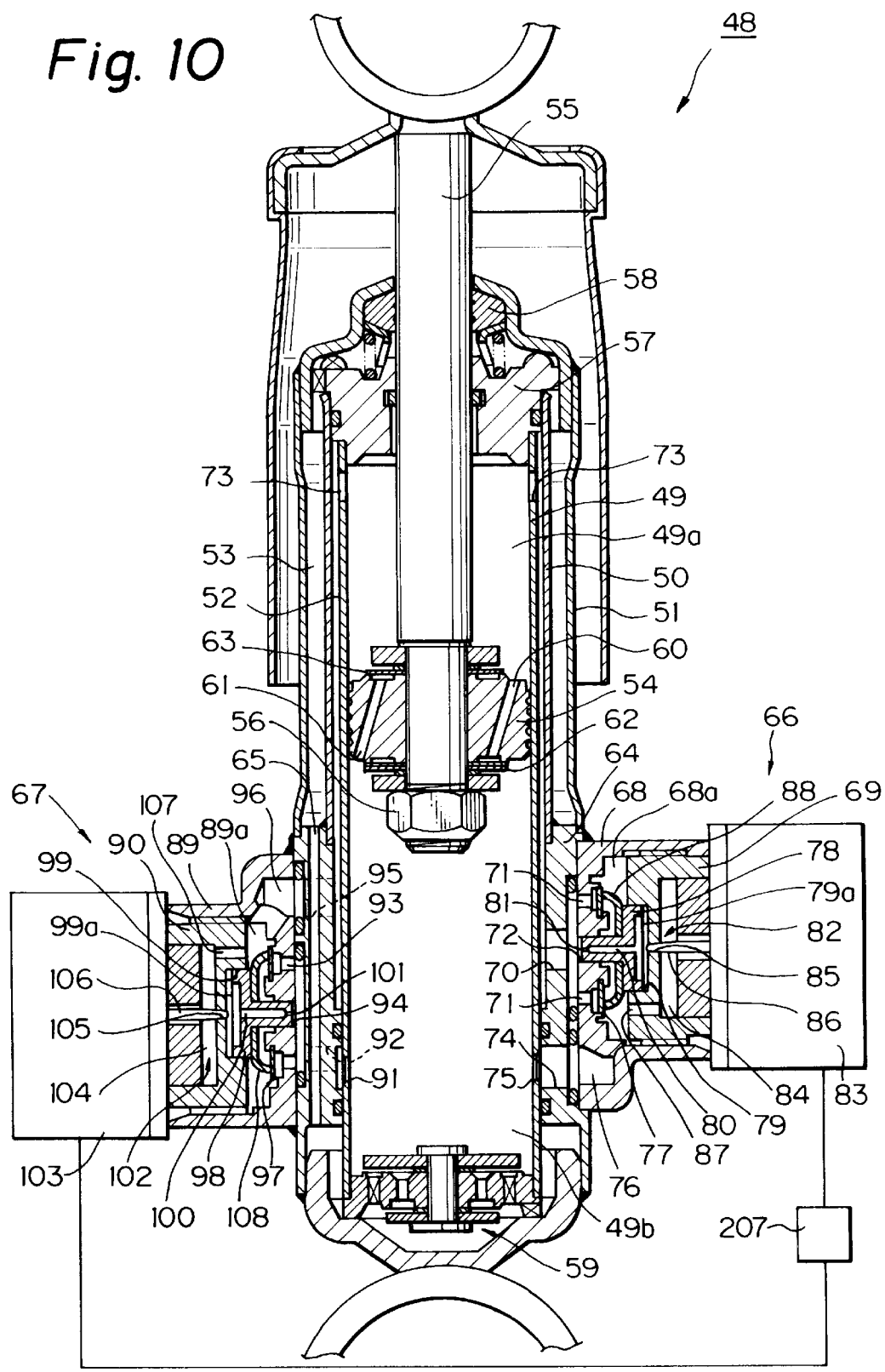
FIG. 10 is a sectional view of a suspension control system according to a second embodiment of the present invention.
Figure 12:
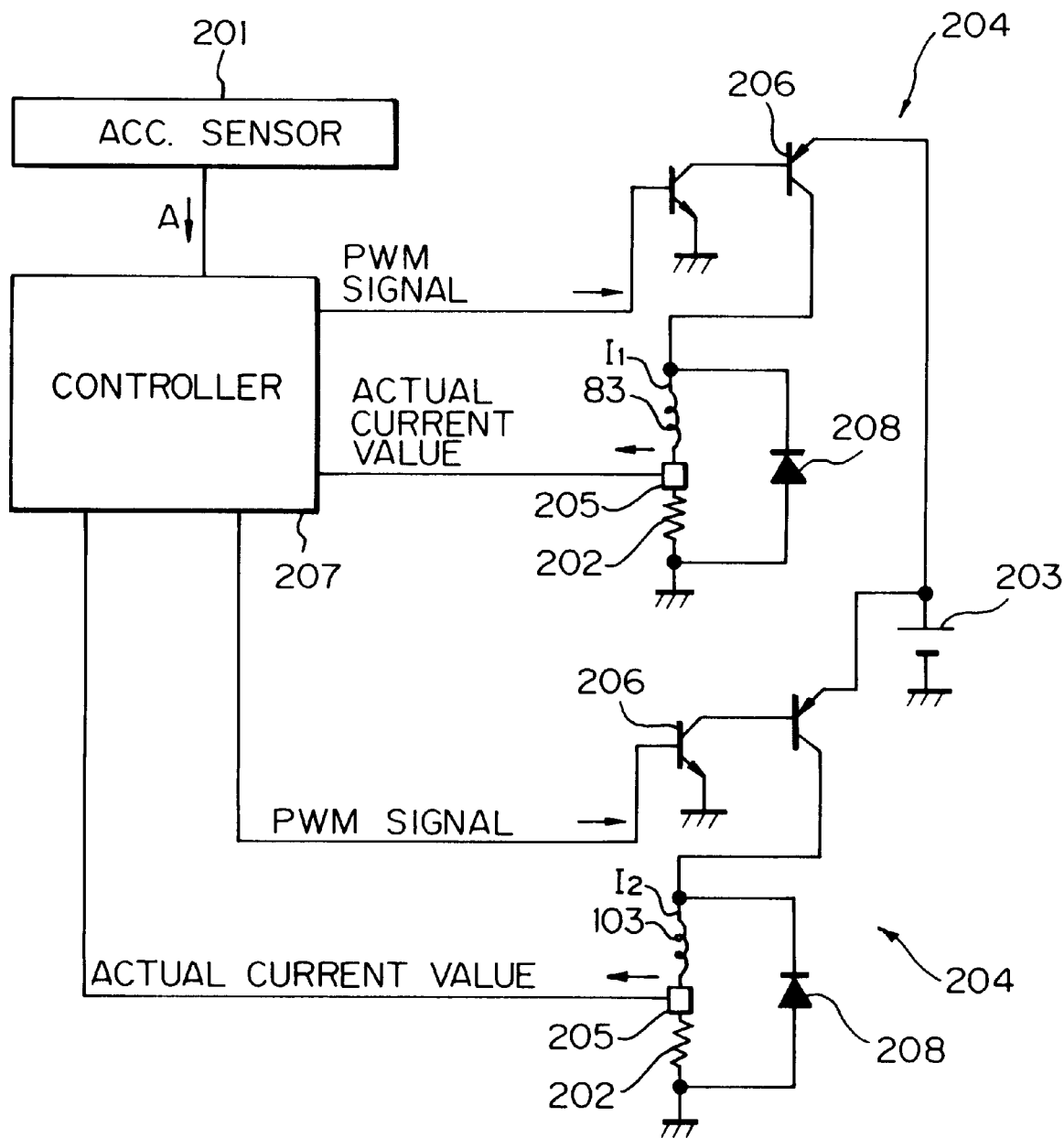
FIG. 12 is a circuit diagram showing a connection between a controller and a proportional solenoid of the suspension control apparatus of FIG. 10.

This suspension control apparatus includes four hydraulic damping force adjusting shock absorbers 48 shown in FIG. 10 and associated with four vehicle wheels, respectively. However, for simplifying the illustration, only one shock absorber is shown. As shown in FIG. 12, proportional solenoids 83 and 103 provided in the hydraulic damping force adjusting shock absorber are connected to a power source 203 and shunt resistors 202 in series and form a part of a closed circuit 204 together with the power source and the shunt resistors. The closed circuit 204 includes a transistor 206. The apparatus further includes a controller (control means; PWM signal generating means) 207 which is similar to the controller 207 of the embodiment shown in FIGS. 1 to 9 and serves to determine command current values for the proportional solenoids 83, 103.

Figure 11:
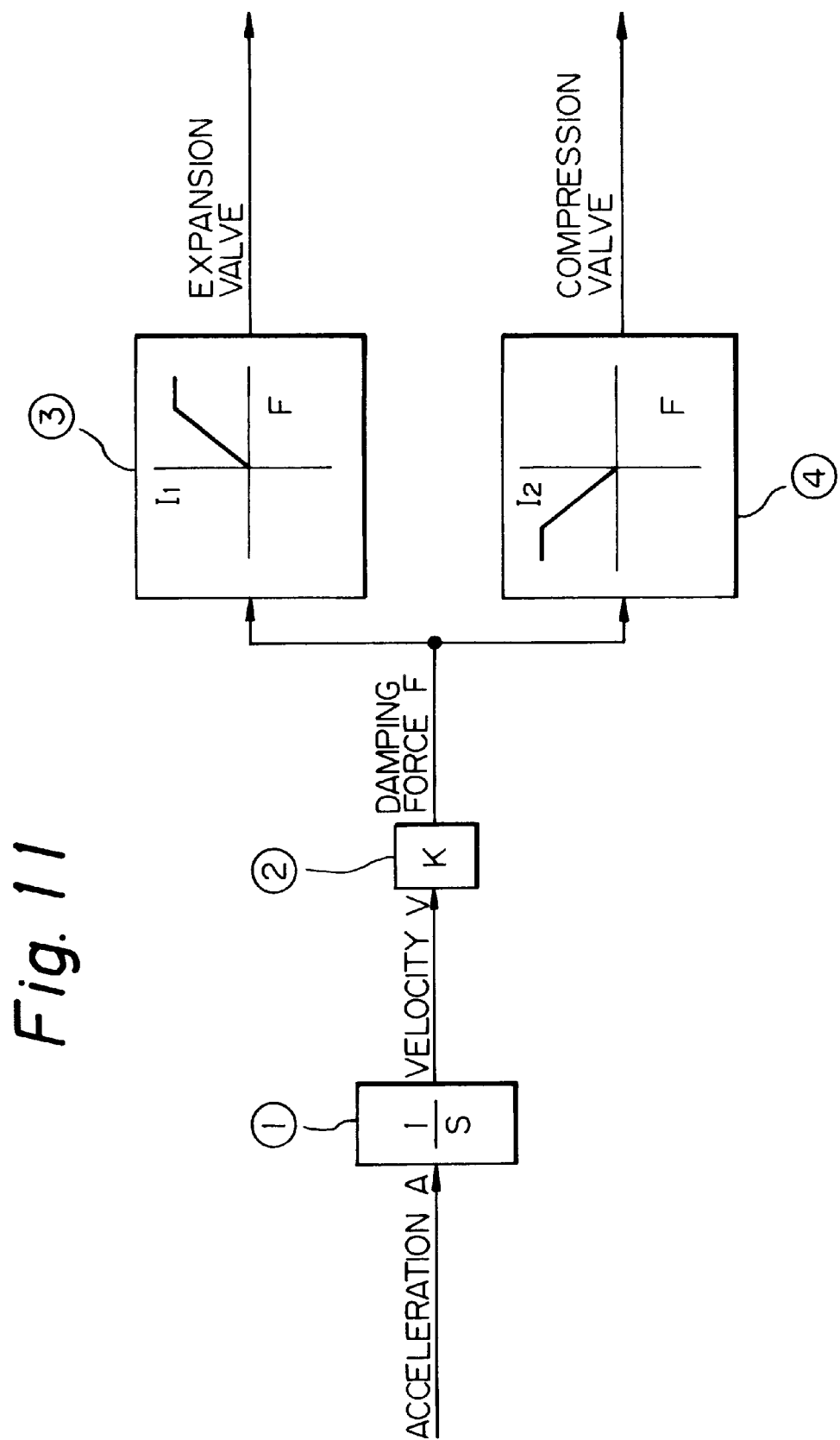
FIG. 11 is a block diagram showing a portion of control steps of the controller of the suspension control apparatus of FIG. 10.

The controller 207 according to this embodiment executes processes shown in FIG. 11, in place of the processes shown in FIG. 8. Particularly, in a block ①, the velocity V of the vehicle in the up-and-down direction is calculated by integrating the acceleration signal A from the acceleration sensor 201, and, in a block ②, a target damping force F is calculated by multiplying the velocity V by a gain K. Here, the target damping force F has a positive value when the vehicle is shifted upwardly and a negative value when the vehicle is shifted downwardly. In a block ③, demand current $I_1$ to the expansion side proportional solenoid 83 corresponding to the target damping force F is calculated, and, in a block ④, demand current $I_2$ to the compression side proportional solenoid 103 corresponding to the target damping force F is calculated. In this case, in the block ③, when the target damping force F has a positive value, the current $I_1$ proportional to the target damping force F is calculated, and, when the target damping force has a negative value, the current $I_1$ is made zero (0). Further, in the block ④, when the target damping force F has a negative value, the current $I_2$ proportional to the target damping force F is calculated, and, when the target damping force has a positive value, the current $I_2$ is made zero (0).

Now, a construction of the hydraulic damping force adjusting shock absorbers 48 will be explained. As shown in FIG. 10, the hydraulic damping force adjusting shock absorber 48 has a cylinder 49, an inner cylinder 50 disposed outside the cylinder 49, and an outer cylinder 51 disposed outside the inner cylinder 50, thereby providing a triple cylinder structure. An annular passage 52 is defined between the cylinder 49 and the inner cylinder 50, and a reservoir chamber 53 is defined between the inner cylinder 50 and the outer cylinder 51.

A piston 54 is slidably mounted within the cylinder 49 so that the interior of the cylinder 49 is divided into two sections to define an upper cylinder chamber 49a and a lower cylinder chamber 49b by the piston 54. The piston 54 is connected, by a nut 56, to one end of a piston rod 55 the other end of which extends out of the cylinder through a rod guide 57 and a seal member 58 provided at an upper end of the cylinder 49. The cylinder 49 is provided at its lower end with a base valve 59 through which the lower cylinder chamber 49b is communicated with the reservoir chamber 53 with moderate flow resistance. Hydraulic fluid is contained within the cylinder 49, and hydraulic fluid and gas are contained in the reservoir chamber 53, so that the change in volume of the cylinder 49 due to extension and retraction of the piston rod 55 can be compensated for by compression/expansion of the gas in the reservoir chamber 53.

The piston 54 is provided with an expansion side passage 60 and a compression side passage 61 for communicating the upper and lower cylinder chambers 49a and 49b with each other. The expansion side passage 60 includes a disc valve 62 for permitting the flow of the hydraulic fluid from the upper cylinder chamber 49a to the lower cylinder chamber 49b to generate a damping force when pressure in the upper cylinder chamber 49a exceeds a predetermined value, and the compression side passage 61 includes a disc valve 63 for permitting the flow of the hydraulic fluid from the lower cylinder chamber 49b to the upper cylinder chamber 49a to generate a damping force when pressure in the lower cylinder chamber 49b exceeds a predetermined value.

A substantially cylindrical passage member 64 is fitted onto a lower portion of the cylinder 49, and lower ends of the inner and outer cylinders 50, 51 are fitted in and on an upper end of the passage member 64. The annular passage 52 extends between the cylinder 49 and the passage member 64, and the reservoir chamber 53 is communicated with the lower cylinder chamber 49b through the base valve 59 by way of a reservoir passage 65 passing axially through the side wall of the passage member 64.

On the side of the passage member 64, there are provided an expansion side damping force adjusting mechanism 66 forming an expansion side communication passage for communicating the upper and lower cylinder chambers 49a and 49b with each other through the annular passage 52, and a compression side damping force adjusting mechanism 67 forming a compression side communication passage for communicating the upper and lower cylinder chambers 49a and 49b with each other through the annular passage 52. In the expansion side damping force adjusting mechanism 66, a bottom of a bottomed cylindrical valve case 68 is joined to the side wall of the passage member 64, and a cylindrical plug 69 having a bottom is threaded within the valve case 68 to define a valve chamber 68a within the valve case 68. The bottom of the valve case 68 is provided with a guide hole 72 and a valve passage 71 for communicating the valve chamber 68a with the annular passage 52 through a passage 70 formed in the side wall of the passage member 64, and the annular passage 52 is communicated with the upper cylinder chamber 49a through a passage 73 formed in the cylinder 49 near the upper end thereof. The bottom of the valve case 68 is also provided with a communication passage 76 for communicating the lower cylinder chamber 49b with the valve chamber 68a through a passage 74 formed in the side wall of the passage member 64 and a passage 75 formed in the cylinder 49 near a lower end thereof.

Within the valve case 68 and near the bottom thereof, there is provided a disc valve 77 as a valve body for permitting the oil flow from the upper cylinder chamber 49a side (of the valve passage 71) to the valve chamber 68a to generate the damping force. A small diameter free end portion of a plunger 78 is slidably fitted into the guide hole 72, and a large diameter base portion of the plunger 78 is slidably fitted into a guide hole 79 formed in the plug 69, so that a back pressure chamber 79a is defined within the guide hole 79. A back pressure passage 80 passes through the plunger 78 along a central axis thereof, and an orifice 81 is formed in the back pressure passage 80. Pressure of the hydraulic fluid flowing into the back pressure passage 80 is reduced by the orifice 81, thereby reducing any load acting on a relief valve 82 which will be described later.

The plug 69 is provided with a relief valve 82 for relieving the pressure in the back pressure chamber 79a. The relief valve 82 is a needle valve having a needle 86 (connected to the proportional solenoid 83) capable of opening and closing a communication passage 85 for communicating a relief chamber 84 formed in the plug 69 (by attaching the proportional solenoid 83 to the open end of the plug 69) and the back pressure chamber 79a. The proportional solenoid 83 serves to adjust relief pressure of the relief valve 82 by biasing the needle 86 toward a valve close position with a force proportional to the applied current I. The relief chamber 84 is communicated with the valve chamber 68a through a relief passage 87.

An urging member 88 abutting against a back surface of the disc valve 77 is connected to the plunger 78 so that the disc valve 77 is urged toward a valve close position by the pressure in the back pressure chamber 79a acting on the plunger 78.

In the compression side damping force adjusting mechanism 67, a bottom of a bottomed cylindrical valve case 89 is joined to the side wall of the passage member 64, and a cylindrical plug 90 having a bottom is threaded within the valve case 89 to define a valve chamber 89a within the valve case 89. The bottom of the valve case 89 is provided with a guide hole 94 and a valve passage 93 for communicating the valve chamber 89a with the lower cylinder chamber 49b through a passage 91 formed in the cylinder 49 near the lower end thereof and a passage 92 formed in the side wall of the passage member 64. The bottom of the valve case 89 is also provided with a communication passage 96 for communicating valve chamber 89a with the annular passage 52 through a passage 95 formed in the side wall of the passage member 64.

Within the valve case 89 and near the bottom thereof, there is provided a disc valve 97 as a valve body for permitting the oil flow from the lower cylinder chamber 49b side (of the valve passage 93) to the valve chamber 89a to generate the damping force. A small diameter free end portion of a plunger 98 is slidably fitted into the guide hole 94, and a large diameter base portion of the plunger 98 is slidably fitted into a guide hole 99 formed in the plug 90, so that a back pressure chamber 99a is defined within the guide hole 99. A back pressure passage 100 passes through the plunger 98 along a central axis thereof, and an orifice 101 is formed in the back pressure passage 100. Pressure of the hydraulic fluid flowing into the back pressure passage 100 is reduced by the orifice 101, thereby reducing any load acting on a relief valve 102 which will be described later.

The plug 90 is provided with a relief valve 102 for relieving the pressure in the back pressure chamber 99a. The relief valve 102 is a needle valve having a needle 106 (connected to the proportional solenoid 103) capable of opening and closing a communication passage 105 for communicating a relief chamber 104 formed in the plug 90 (by attaching the proportional solenoid 103 to the open end of the plug 90) and the back pressure chamber 99a. The proportional solenoid 103 serves to adjust relief pressure of the relief valve 102 by biasing the needle 106 toward a valve close position with a force proportional to the applied current I. The relief chamber 104 is communicated with the valve chamber 89a through a relief passage 107.

An urging member 108 abutting against a back surface of the disc valve 97 is connected to the plunger 98 so that the disc valve 97 is urged toward a valve close position by the pressure in the back pressure chamber 99a acting on the plunger 98.

During the extension stroke of the piston rod 55, due to the sliding movement of the piston 54, the hydraulic fluid in the upper cylinder chamber 49a flows into the lower cylinder chamber 49b through the passage 73 and annular passage 52 and through the passage 70, valve passage 71, valve chamber 68a, communication passage 76, passage 74 and passage 75 of the expansion side damping force adjusting mechanism 66. The disc valve 77 is opened by the pressure of the hydraulic fluid in the upper cylinder chamber 49a to adjust the flow area of the valve passage 71, thereby generating the damping force. In this case, since the disc valve 77 is urged toward the valve close position by the urging member 88, the damping force proportional to the urging force is generated. On the other hand, in the compression side damping force adjusting mechanism 67, since the disc valve 97 and the relief valve 102 are closed by the pressure in the upper cylinder chamber 49a, the hydraulic fluid does not flow.

The urging force of the urging member 88 is generated by transmitting the pressure of the hydraulic fluid in the upper cylinder chamber 49a to the back pressure chamber 79a through the back pressure passage 80 of the plunger 78 and by having the pressure of the hydraulic fluid in the back pressure chamber 79a act on a pressure receiving surface of the large diameter base portion of the plunger 78. In this case, when the pressure in the back pressure chamber 79a exceeds the set pressure of the relief valve 82, since the relief valve 82 is opened so that the hydraulic fluid in the back pressure chamber 79a is relieved into the relief chamber 84 and then flows into the valve chamber 68a associated with the lower cylinder chamber 49b through the relief passage 87, the pressure in the back pressure chamber 79a can freely be set by the relief valve 82. Accordingly, by setting the relief pressure of the relief valve 82 by adjusting the current I applied to the proportional solenoid 83 to adjust the biasing force for the needle 86, the damping force can be controlled.

During the compression stroke of the piston rod 55, due to the sliding movement of the piston 54, the hydraulic fluid in the lower cylinder chamber 49b flows into the upper cylinder chamber 49a through the passage 91 and through the passage 92, valve passage 93, valve chamber 89a, communication passage 96, passage 95, annular passage 52 and passage 73 of the compression side damping force adjusting mechanism 67. The disc valve 97 is opened by the pressure of the hydraulic fluid in the lower cylinder chamber 49b to adjust the flow area of the valve passage 93, thereby generating the damping force. In this case, since the disc valve 97 is urged toward the valve close position by the urging member 108, the damping force proportional to the urging force is generated. On the other hand, in the expansion side damping force adjusting mechanism 66, since the disc valve 77 and the relief valve 82 are closed by the pressure in the lower cylinder chamber 49b, the hydraulic fluid does not flow.

The urging force of the urging member 108 is generated by transmitting the pressure of the hydraulic fluid in the lower cylinder chamber 49b to the back pressure chamber 99a through the back pressure passage 100 of the plunger 98 and by having the pressure of the hydraulic fluid in the back pressure chamber 99a act on a pressure receiving surface of the large diameter base portion of the plunger 98. In this case, when the pressure in the back pressure chamber 99a exceeds the set pressure of the relief valve 102, since the relief valve 102 is opened so that the hydraulic fluid in the back pressure chamber 99a is relieved into the relief chamber 104 and then flows into the valve chamber 89a associated with the upper cylinder chamber 49a through the relief passage 107, the pressure in the back pressure chamber 99a can freely be set by the relief valve 102. Accordingly, by setting the relief pressure of the relief valve 102 by adjusting the current I applied to the proportional solenoid 83 to adjust the biasing force for the needle 106, the damping force can be controlled.

As mentioned above, by adjusting the applied current values I to the proportional solenoids 83, 103, and, thus, by adjusting the relief pressure values of the relief valves 87, 102, the damping forces at the expansion and compression sides can be controlled.

In the suspension control apparatus having the above-mentioned arrangement, as is in the first embodiment, the currents actually flowing through the proportional solenoids 83, 103 are detected, the correction coefficient $K_1$ is determined on the basis of the measured current values, and the command currents $I_1$, $I_2$ are corrected to obtain the desired damping forces. Thus, even if temperatures of the proportional solenoids 83, 103 are increased to increase the resistance values thereof due to the application of the currents to the proportional solenoids 83, 103, since the duty ratios of the PWM signal are adjusted to correct the currents I flowing through the proportional solenoids 83, 103, the desired damping forces can be obtained, high accurate damping force adjustment (suspension control) can be performed, and the riding comfort and steering stability can be improved.

Next, a suspension control apparatus according to a third embodiment of the present invention will be explained with reference to FIGS. 13 to 16.

Figure 6:
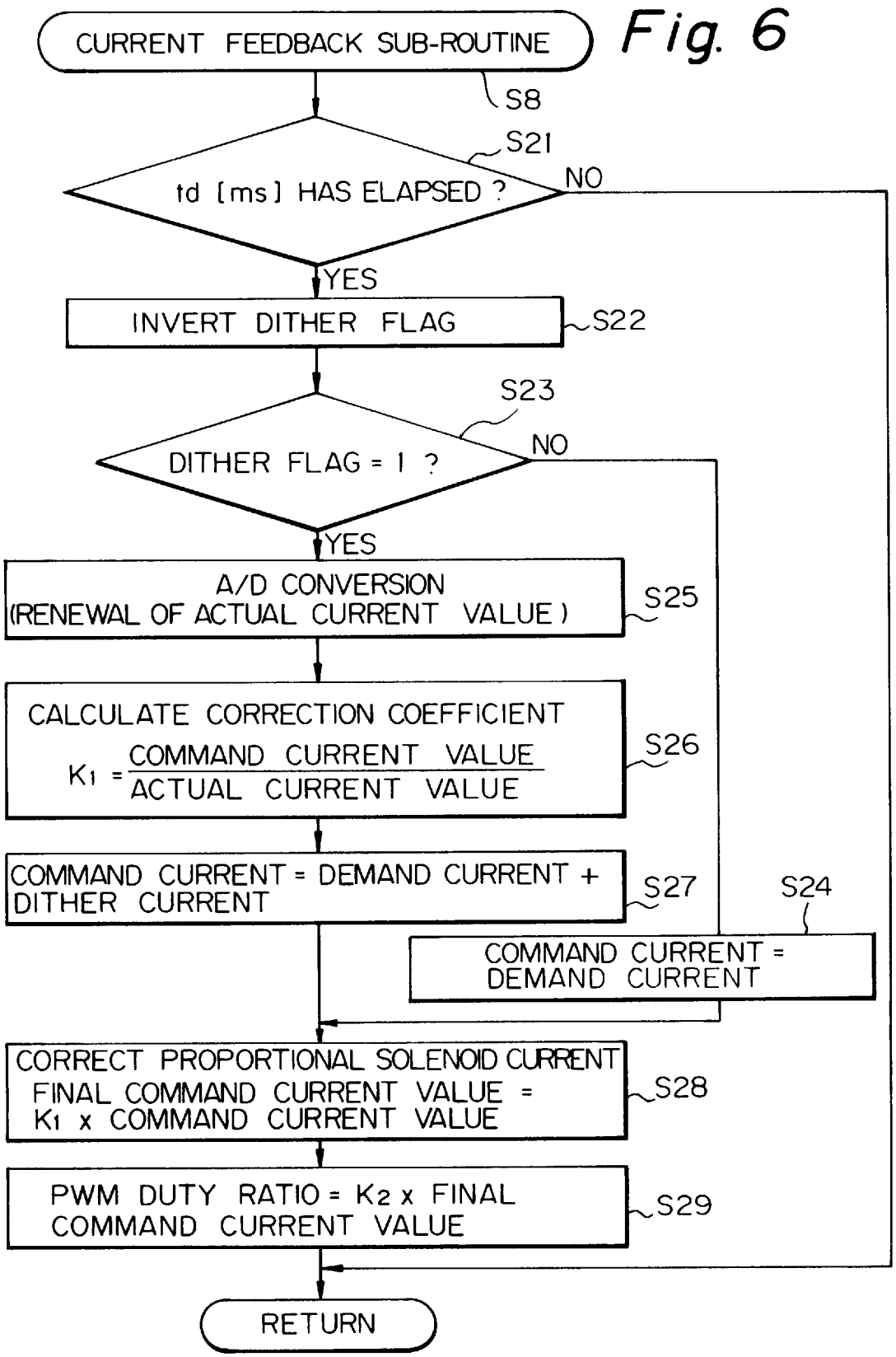
FIG. 6 is a flow chart showing a current feedback subroutine in the flow chart of FIG. 5.
Figure 7:
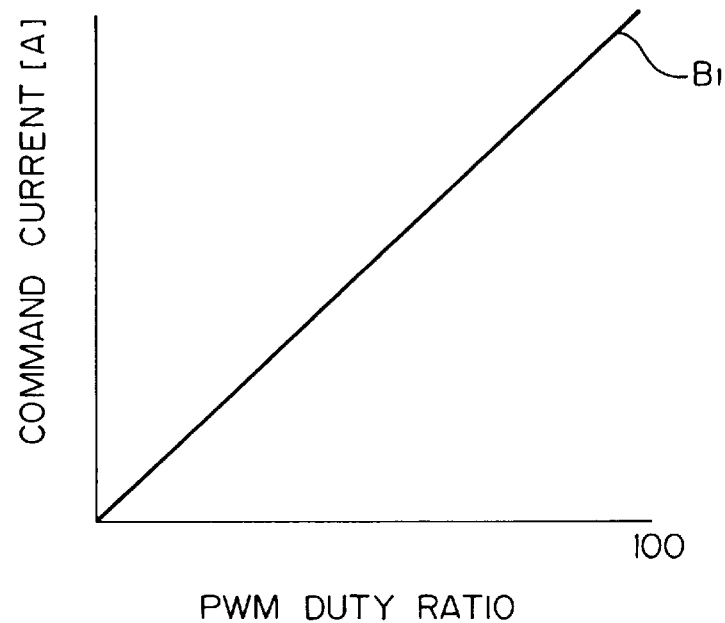
FIG. 7 is a graph showing a map illustrating a relationship between a current and a duty ratio obtained in the subroutine of FIG. 6.
Figure 13:
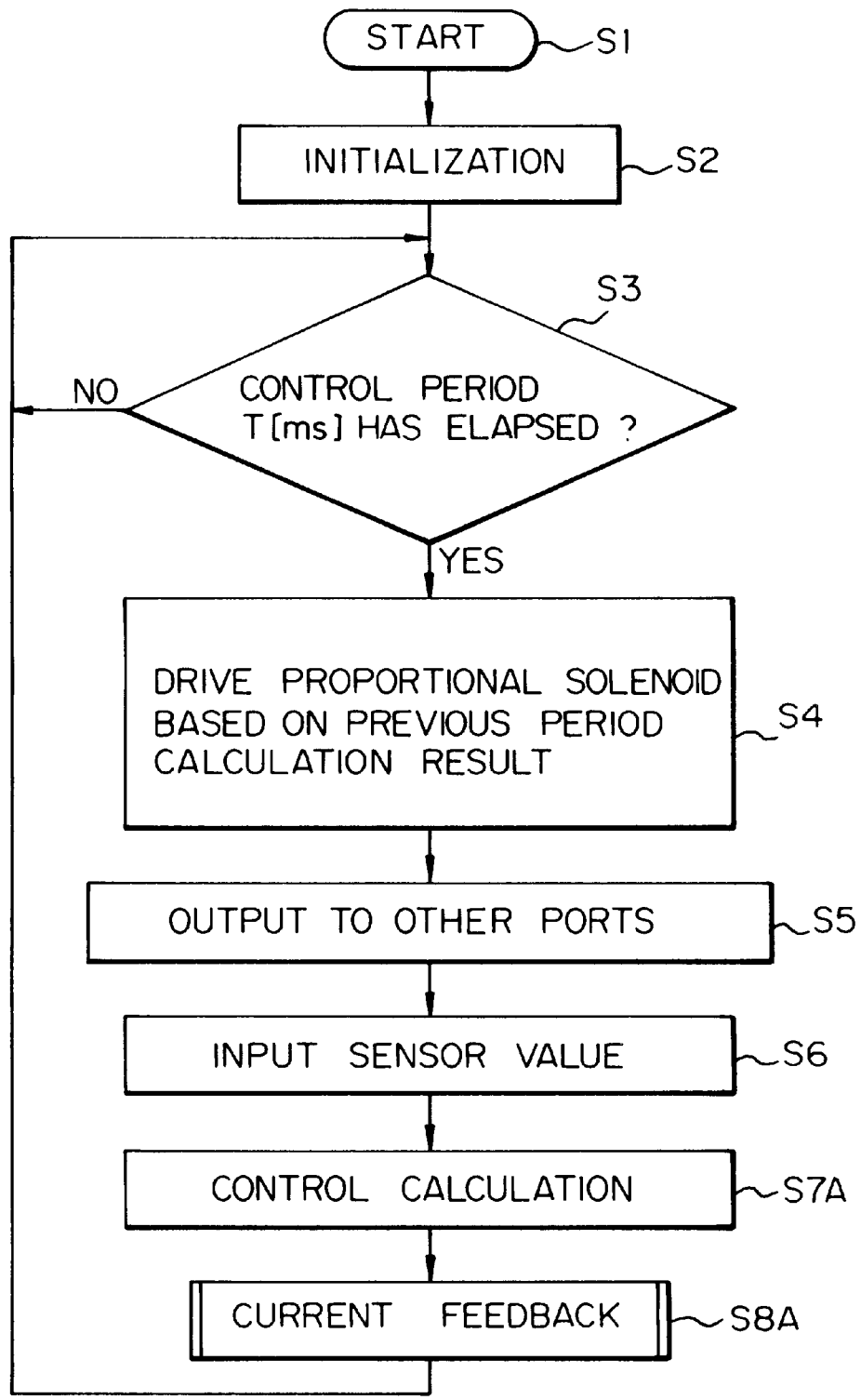
FIG. 13 is a flow chart showing process steps of a controller of a suspension control system according to a third embodiment of the present invention.
Figure 14:
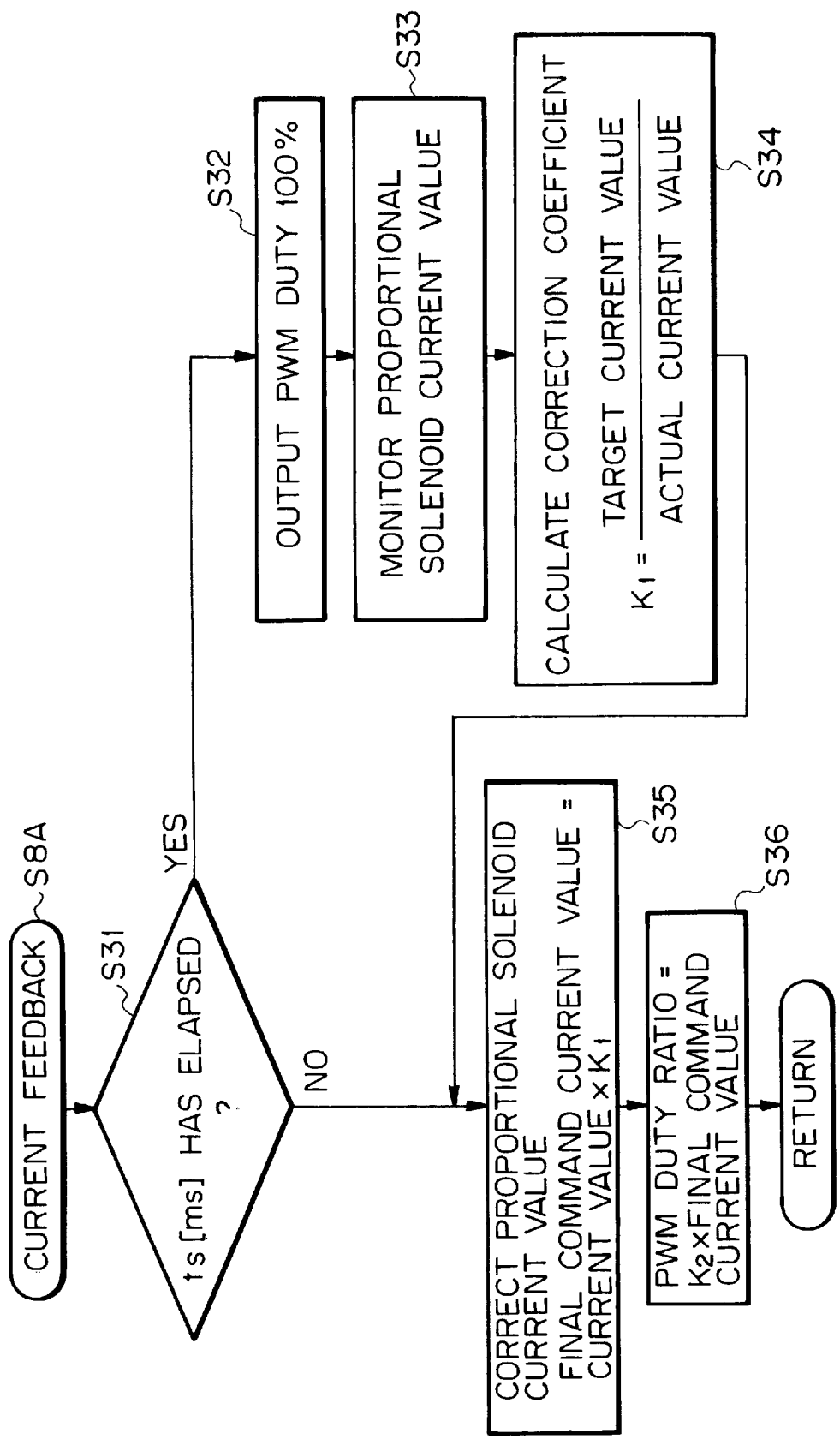
FIG. 14 is a flow chart showing a current feedback sub-routine in the flow chart of FIG. 13.

This suspension control apparatus differs from the suspension control apparatus according to the first embodiment shown in FIGS. 1 to 9 in the point that a controller executes processes shown in FIGS. 13 and 14 in place of the processes shown in FIGS. 5 and 6. The same elements as those in the first embodiment are omitted from illustration and explanation. Incidentally, in this third embodiment, for simplifying the description, dither is not added to the applied current, but demand current determined in a step S7A in FIG. 13 is used as command current as it is. However, if necessary, in the step S7A, after the demand current is determined, the steps S21, S22, S23, S24, S27 in the current feedback sub-routine shown in FIG. 6 may be executed, thereby adding the dither to the command current.

The controller 207 of the suspension control apparatus according to the third embodiment executes a current feedback sub-routine (step S8A) shown in FIG. 13 in place of the step S8 shown in FIG. 5.

Now, the current feedback sub-routine in the step S8A will be explained with reference to FIG. 14.

First of all, it is judged whether the correction judge period $t_s$ [ms] has elapsed or not (step S31).

In this step S31, if YES, the PWM signal having 100% duty ratio is outputted to the proportional solenoid 38 (refer to FIG. 3) for a predetermined time period (refer to a time period f–g in FIG. 22 which will be described later) until the current reaches a steady-state value (step S32). Then, the detection data of the current sensor 205 (refer to FIG. 3) is A/D-converted to determine the current (actual current) flowing through the proportional solenoid 38 (step S33). Then, the correction coefficient $K_1$ is calculated by dividing the target current value (reference data) corresponding to in the application of the PWM signal having 100% duty ratio by the actual current value (step S34).

On the other hand, if NO in the step S31 or when the treatment in the step S34 is finished, a new command current value (final command current value) is calculated by multiplying the command current value by the correction coefficient $K_1$ (step S35), and, then, by multiplying the final command current value by a predetermined gain $K_2$, the required duty ratio of the PWM signal is obtained (step S36). Thereafter, the program returns to the main routine in FIG. 13.

Figure 15:
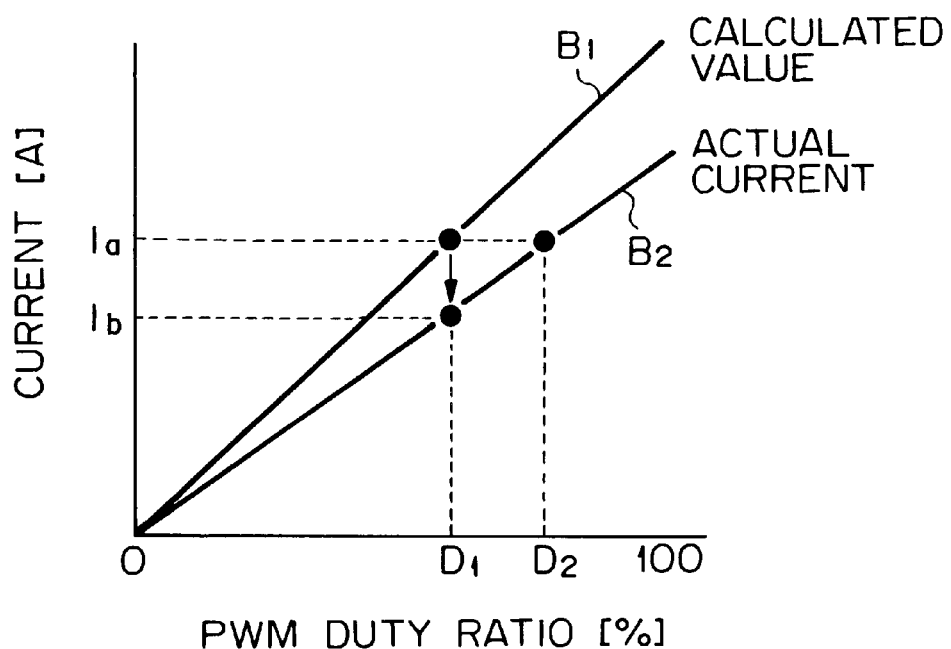
FIG. 15 is a graph showing an example of a map illustrating a relationship between a current and a duty ratio obtained in the sub-routine of FIG. 14.
Figure 16:
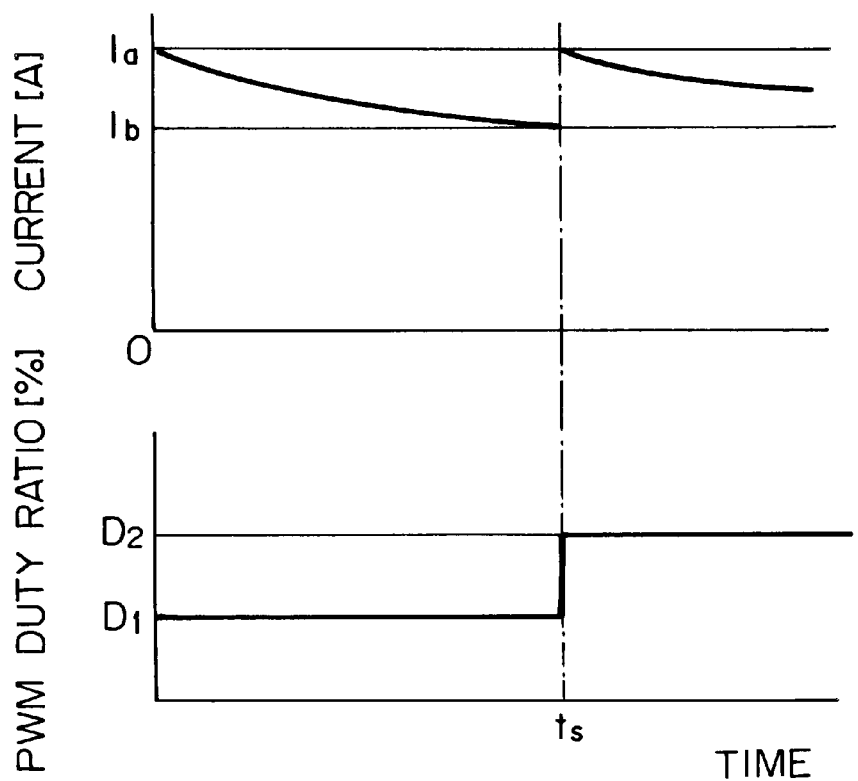
FIG. 16 is a graph for explaining an operation of a controller carrying out the flow chart of FIG. 14.

Now, a case where the current becomes not to easily flow through the proportional solenoid 38 due to increase in temperature (and, thus, resistance) of the proportional solenoid 38, for example, a case where even when the PWM signal having the predetermined duty ratio is outputted, the current having the desired magnitude cannot flow through the solenoid, will be explained with reference to FIG. 15. After the correction judge period $t_s$[ms] has elapsed, when the PWM signal having the predetermined duty ratio is supplied to the proportional solenoid 38, if the current flowing through the proportional solenoid is decreased from $I_a$ to $I_b$ due to increase in temperature of the proportional solenoid 38, the new command current value (final command current value) is calculated by multiplying the command current value by the correction coefficient $K_1$, and the duty ratio of the PWM signal is calculated by multiplying the final command current value by the gain $K_2$ (step S36). In this case, the duty ratio of the PWM signal is corrected, for example, from (initial) $D_1$% to $D_2$% ($D_2$>$D_1$). FIG. 16 shows a relation between the actual current and the duty ratio when the constant command current is outputted. As shown in FIG. 16, as time passes, the temperature is increased to tend to decrease the actual current. However, by increasing the duty ratio, the desired applied current $I_a$ can be obtained.

In the suspension control apparatus having the above-mentioned arrangement, as in the first embodiment, the current actually flowing through the proportional solenoid 38 is detected, the correction coefficient $K_1$ is determined on the basis of the measured current value, and the command current is corrected to obtain the desired damping force. Thus, even if the temperature of the proportional solenoid 38 is increased to increase the resistance value thereof due to the application of the current to the proportional solenoid 38, since the duty ratio of the PWM signal is adjusted to correct the current I flowing through the proportional solenoid 38, the desired damping forces can be obtained, high accurate damping force adjustment (suspension control) can be performed, and the riding comfort and steering stability can be improved.

Figure 17:
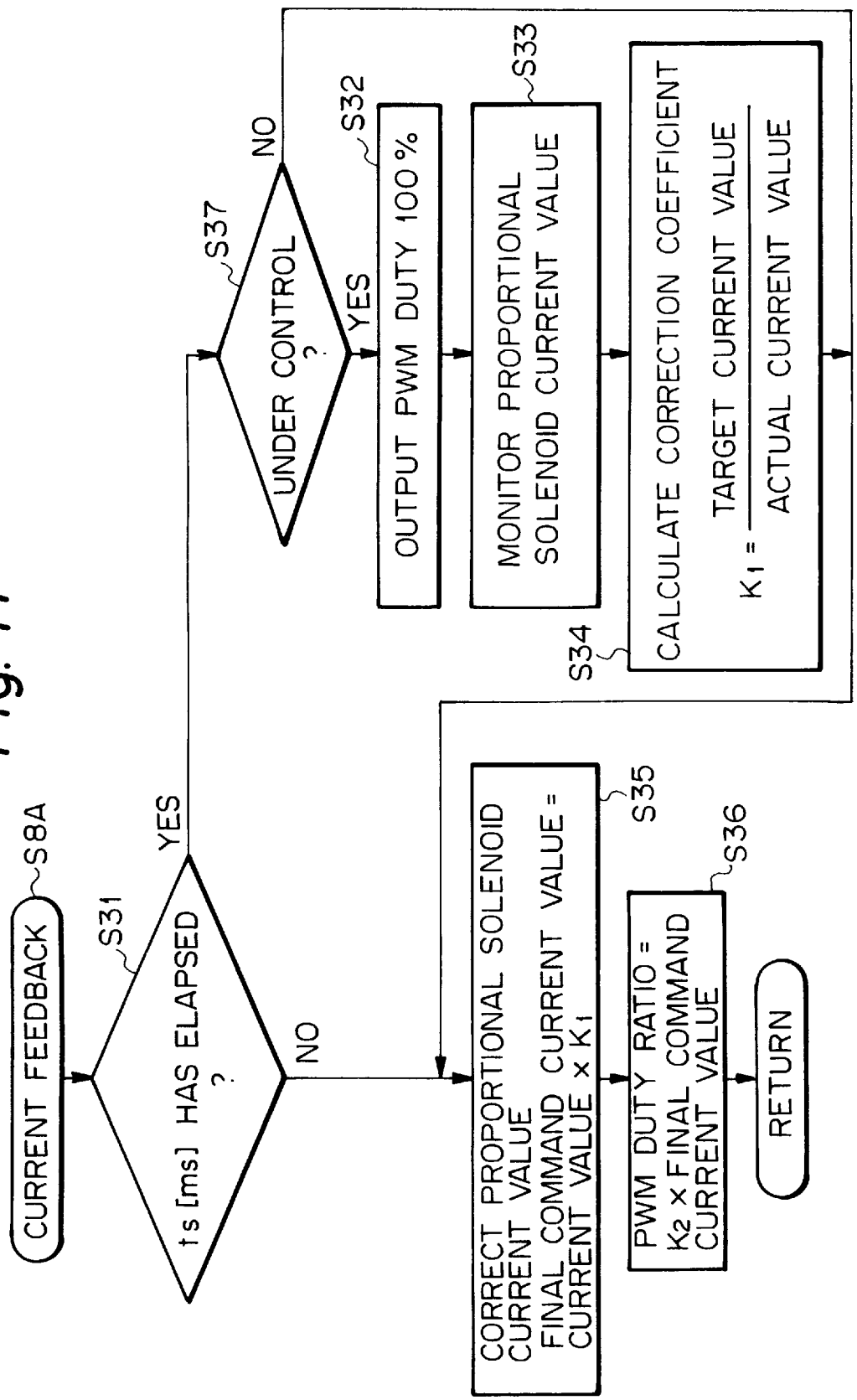
FIG. 17 is a flow chart showing another sub-routine which can be used in place of the current feedback sub-routine of FIG. 14.

Incidentally, in the step S32, if it is not desirable to wait until the current corresponding to the PWM signal having 100% duty ratio reaches the steady-state value, between the step S32 and the step S33, there may be provided a judge step for skipping the steps S33, 34 and for executing the step S35 before the steady-state value is reached. This also applies to FIGS. 17 and 19 (described later).

In the suspension control apparatus according to the third embodiment, while an example that the command current is corrected in every correction judge period $t_s$ [ms] is explained, the present invention is not limited to such an example. For example, in place of the treatment shown in FIG. 14, the treatment shown in FIG. 17 may be executed. That is to say, after a predetermined time period has elapsed, it may be judged whether the target damping force F in the block ② in FIG. 8 is not zero (0) but the control wherein the adjustment of the damping force is required is being performed, and, if such control is being performed, the correction may be effected after such control is finished. More specifically, if it is judged as YES in the step S31, prior to the treatment in the step S32, it is judged whether the control is being performed (step S37); and, if it is judged as NO in the step S37, the program goes to the step S35, whereas, if it is judged as YES in the step S37, the program goes to the step S32.

Figure 18:
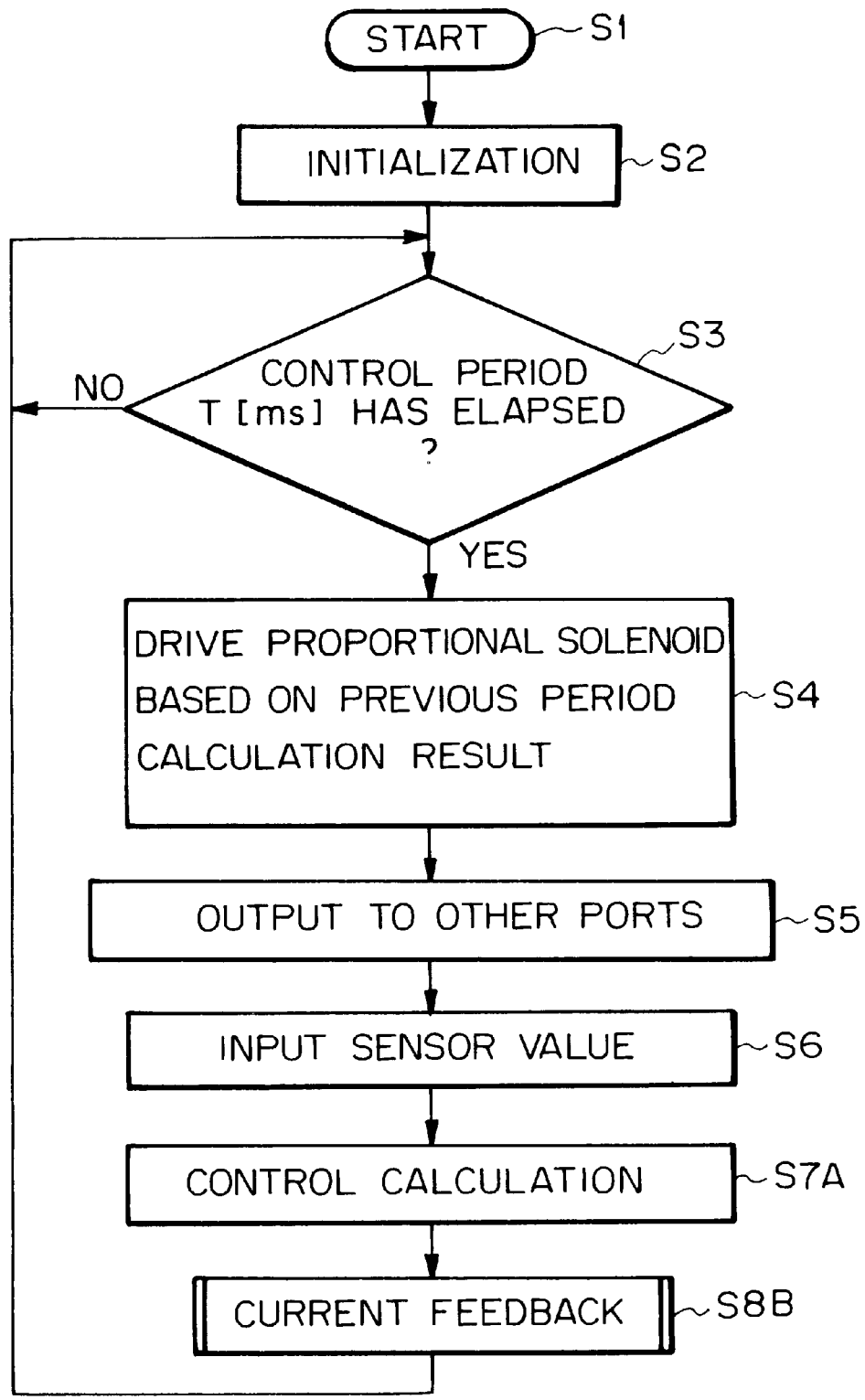
FIG. 18 is a flow chart showing process steps of a controller of a suspension control system according to a fourth embodiment of the present invention.
Figure 19:
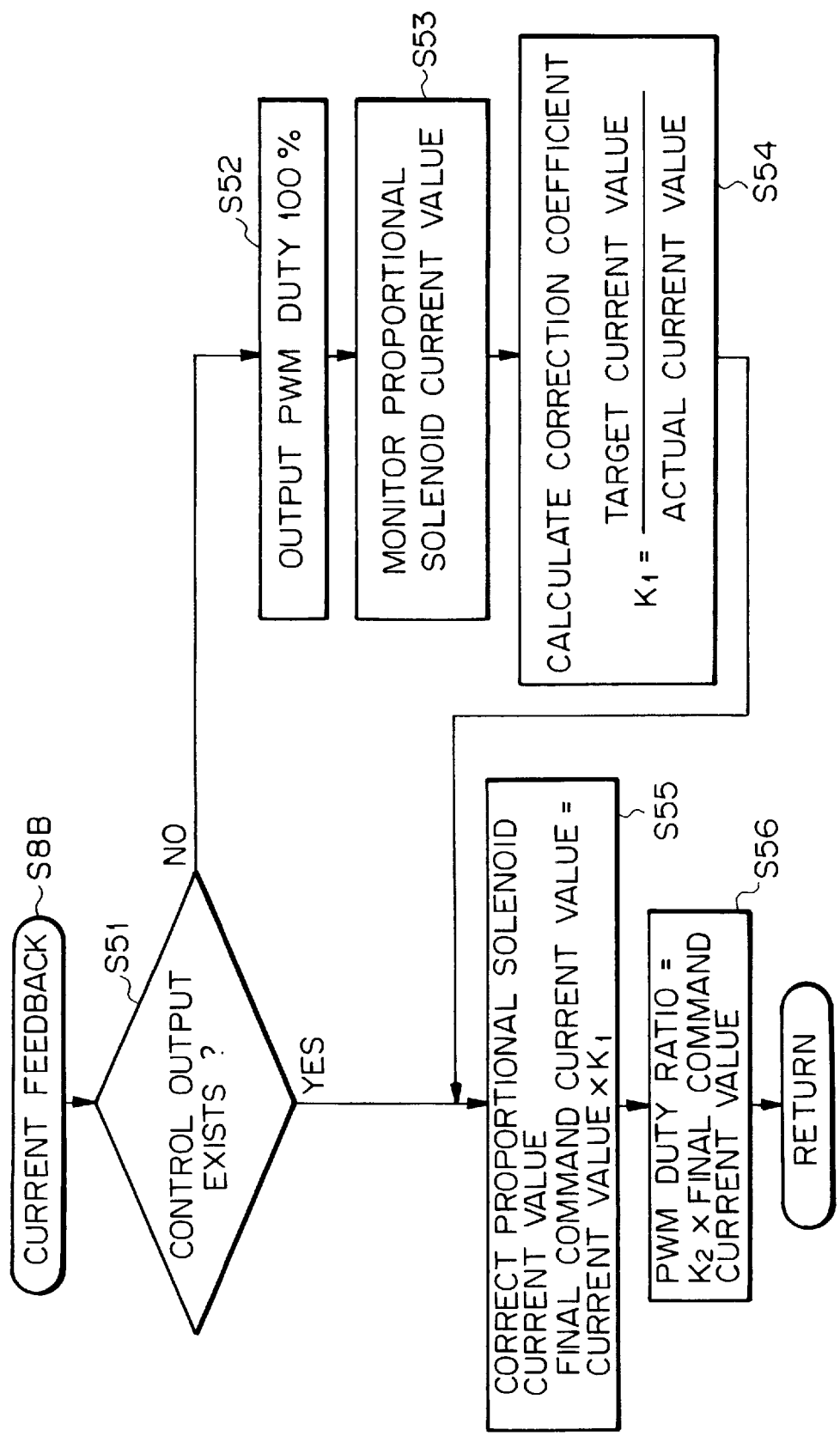
FIG. 19 is a flow chart showing a current feedback sub-routine in the flow chart of FIG. 14.

Next, a suspension control apparatus according to a fourth embodiment of the present invention will be explained with reference to FIGS. 18 and 19. This suspension control apparatus differs from that of the first embodiment shown in FIGS. 1 to 9 in the point that treatments shown in FIGS. 18 and 19 are performed by a controller 207 in place of the treatments shown in FIGS. 5 and 6. The same elements as those in the first embodiment will be omitted from illustration and explanation.

The controller 207 of the suspension control apparatus according to the fourth embodiment executes current feed-back sub-routines in a step S7A of FIG. 18 (same as the step S7A of FIG. 13) and in a step S8B, in place of the steps S7 and S8 of FIG. 5.

Now, the current feedback sub-routine in the step S8B will be explained with reference to FIG. 19.

First of all, it is judged whether the PWM signal is outputted in order to change the damping force or not (target damping force≠0 or not) (step S51). In the step S51, if NO (target damping force≠0), the PWM signal having 100% duty ratio is outputted to the proportional solenoid 38 (refer to FIG. 3) (step S52). Then, the detection data of the current sensor 205 (refer to FIG. 3) is A/D-converted to determine the current (actual current) flowing through the proportional solenoid 38 (step S53). Then, the correction coefficient $K_1$ is calculated by dividing the command current value by the actual current value (step S54).

If it is judged as YES (target damping force=0) in the step S51 or when the treatment in the step S54 is finished, a new command current value (final command current value) is calculated by multiplying the command current value by the correction coefficient $K_1$ (step S55), and the required duty ratio of the PWM signal is calculated by multiplying the final command current value by the gain $K_2$ (step S56). Thereafter, the program returns to the main routine in FIG. 18.

In the suspension control apparatus according to the fourth embodiment having the above-mentioned arrangement, as in the first embodiment, the current actually flowing through the proportional solenoid 38 is detected, the correction coefficient $K_1$ is determined on the basis of the measured current value, and the command current is corrected to obtain the desired damping force. Thus, even if the temperature of the proportional solenoid 38 is increased to increase the resistance value thereof due to the application of the current to the proportional solenoid 38, since the duty ratio of the PWM signal is adjusted to correct the current I flowing through the proportional solenoid 38, the desired damping forces can be obtained, highly accurate damping force adjustment (suspension control) can be performed, and the riding comfort and steering stability can be improved.

Figure 20:
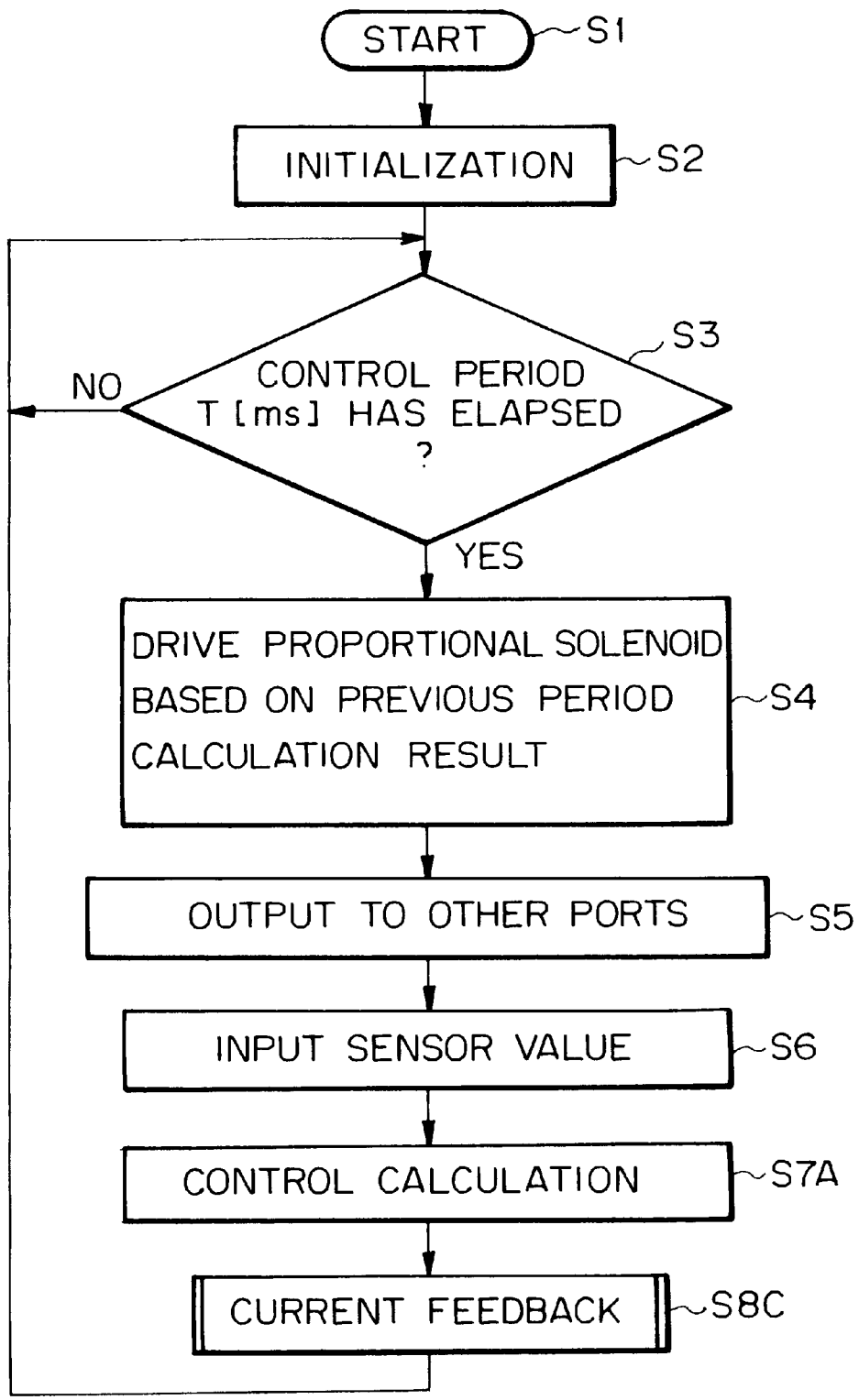
FIG. 20 is a flow chart showing process steps of a controller of a suspension control system according to a fifth embodiment of the present invention.
Figure 21:
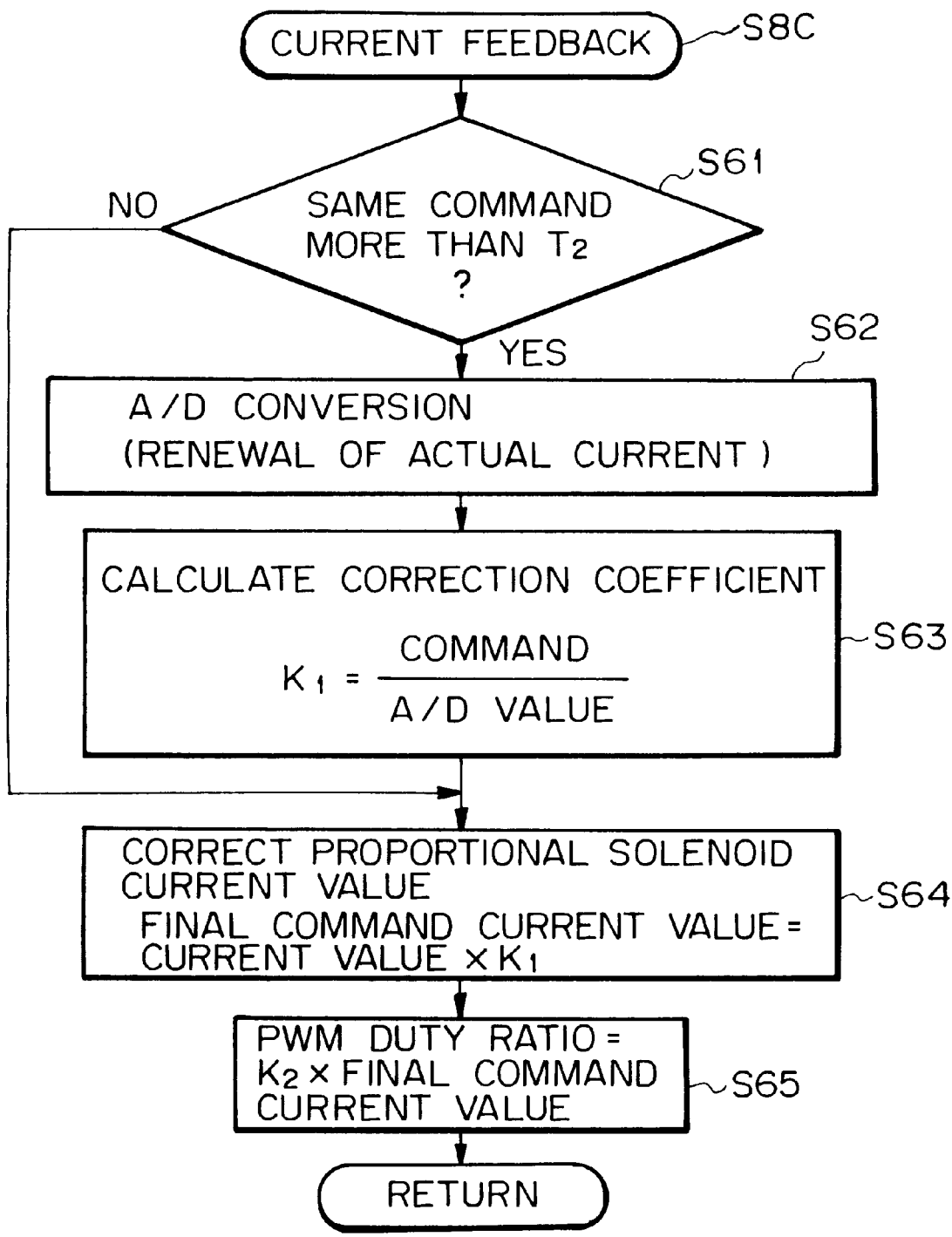
FIG. 21 is a flow chart showing a current feedback sub-routine in the flow chart of FIG. 20.

Next, a suspension control apparatus according to a fifth embodiment of the present invention will be explained with reference to FIGS. 20 to 22. This suspension control apparatus differs from that of the first embodiment shown in FIGS. 1 to 9 in the point that treatments shown in FIGS. 20 and 21 are performed by a controller 207 in place of the treatments shown in FIGS. 13 and 14. The same elements as those in the first embodiment will be omitted from illustration and explanation.

The controller 207 of the suspension control apparatus according to the fifth embodiment executes current feedback sub-routines in a step S7A of FIG. 20 (same as the step S7A of FIG. 13) and in a step S8C, in place of the steps S7 and S8 of FIG. 5.

Now, the current feedback sub-routine in the step S8C will be explained with reference to FIG. 21.

First of all, it is judged whether the PWM signal having the same duty ratio (and, accordingly, the same command current) is outputted for a time period greater than a reference time period $T_1$ or not (step S61). The reference time period $T_1$ is set on the basis of inductance of the proportional solenoid 38. That is to say, when the command current having a predetermined magnitude is supplied to the proportional solenoid 38, the current (actual current) actually flowing through the proportional solenoid 38 presents a transient phenomenon, for example, as shown in FIG. 22, and, after a predetermined time period determined by the inductance and the like has elapsed, the actual current value reaches a steady-state current value. A time period (time period f–g) until the steady-state current value is obtained is referred to as the reference time period $T_1$.

In the step S61, if YES, the detection data of the current sensor 205 (refer to FIG. 3) is A/D-converted to determine the current (actual current) flowing through the proportional solenoid 38 (step S62). Then, the correction coefficient $K_1$ is calculated by dividing the command current value by the actual current value (step S63).

If it is judged as NO in the step S61 or when the treatment in the step S63 is finished, a new command current value (final command current value) is calculated by multiplying the command current value by the correction coefficient $K_1$ (step S64), and the required duty ratio of the PWM signal is calculated by multiplying the final command current value by the gain $K_2$ (step S65). Thereafter, the program returns to the main routine in FIG. 20.

In the suspension control apparatus according to the fifth embodiment having the above-mentioned arrangement, as in the first embodiment, the current actually flowing through the proportional solenoid 38 is detected, the correction coefficient $K_1$ is determined on the basis of the measured current value, and the command current is corrected to obtain the desired damping force. Thus, even if the temperature of the proportional solenoid 38 is increased to increase the resistance value thereof due to the application of the current to the proportional solenoid 38, since the duty ratio of the PWM signal is adjusted to correct the current I flowing through the proportional solenoid 38, the desired damping forces can be obtained, highly accurate damping force adjustment (suspension control) can be performed, and the riding comfort and steering stability can be improved.

Further, the correction of the command current may be performed when the PWM signal having the same duty ratio (and, accordingly, the same command current) is outputted for a time period greater than the reference time period $T_1$ set on the basis of the inductance of the proportional solenoid 38. With this arrangement, since the duty ratio of the PWM signal is determined after the current flowing through the proportional solenoid 38 reaches the steady-state current value after the transient phenomenon, the duty ratio corresponding to the desired damping force can be set accurately, thereby improving the accuracy of the damping force adjustment (suspension control) accordingly.

Next, a suspension control apparatus according to a sixth embodiment of the present invention will be explained with reference to FIGS. 23 to 26. Incidentally, the same elements as those shown in FIGS. 1 to 22 will be omitted from illustration and explanation.

Figure 22:
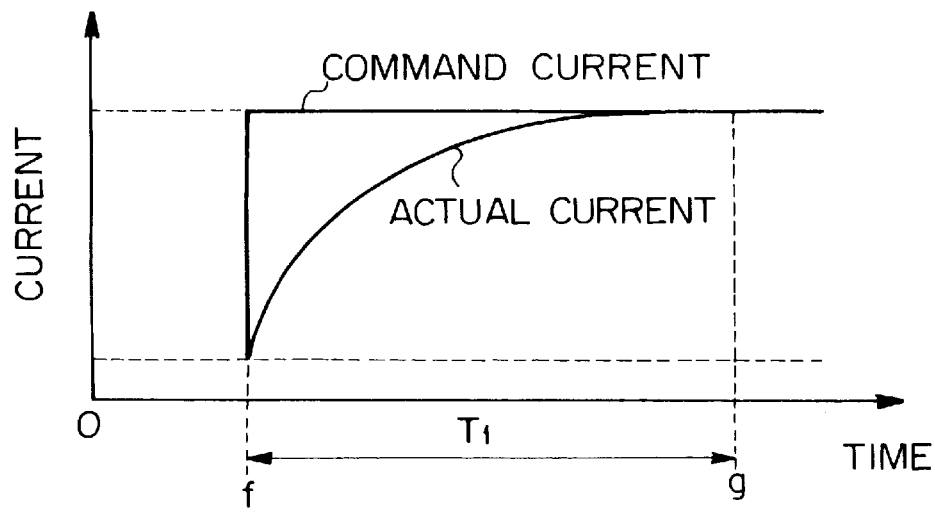
FIG. 22 is a graph for explaining an operation of the suspension control system according to the fifth embodiment.
Figure 23:
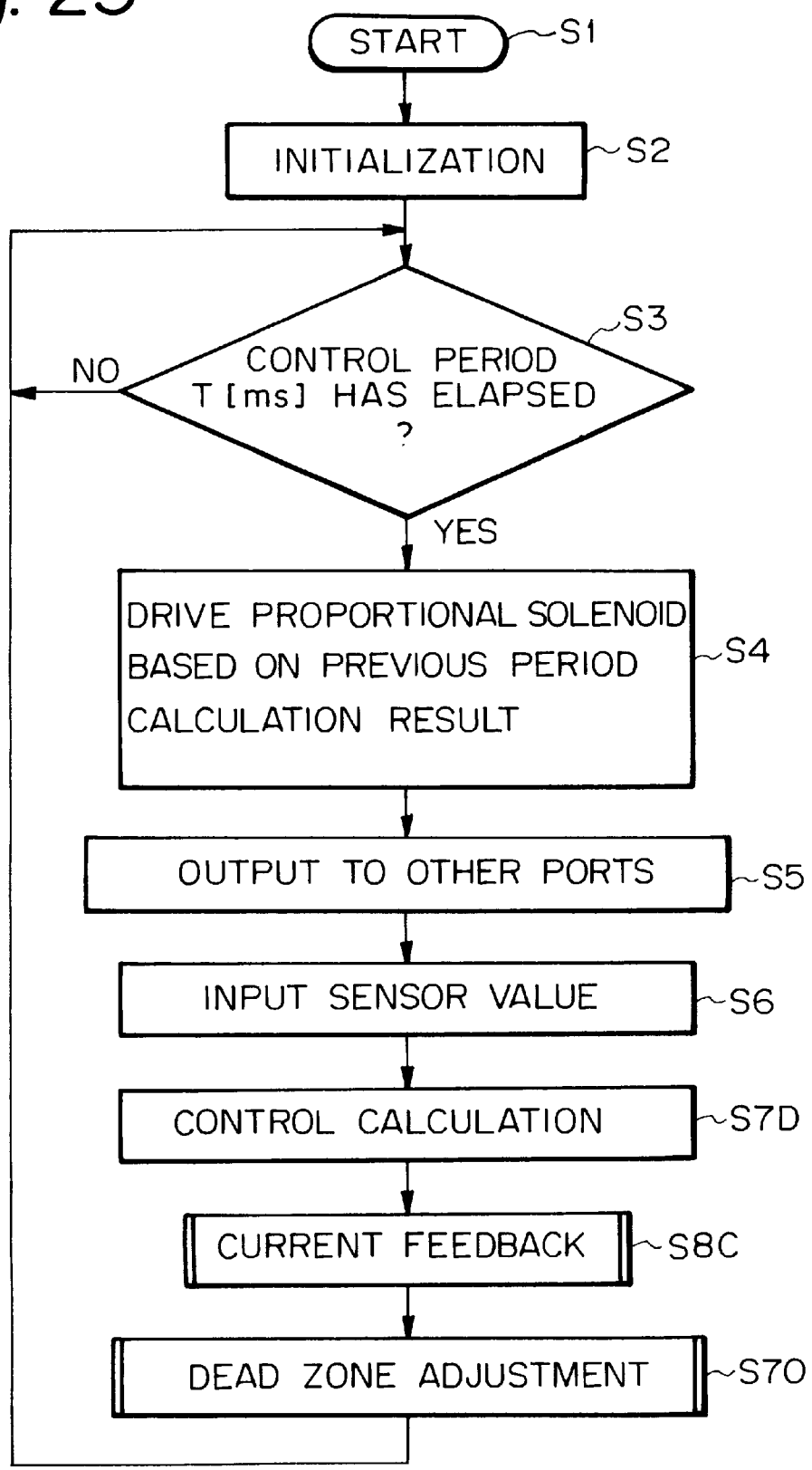
FIG. 23 is a flow chart showing process steps of a controller of a suspension control system according to a sixth embodiment of the present invention.

In comparison with the fifth embodiment shown in FIGS. 20 to 22, the suspension control apparatus according to the sixth embodiment executes treatment shown in FIG. 23 in place of the treatment shown in FIG. 20.

As shown in FIG. 23, in the suspension control apparatus according to the sixth embodiment, in place of the step S7A of FIG. 20, a step S7D is provided, and, following the current feedback sub-routine in the step S8C, a dead zone adjusting sub-routine (step S70) is executed.

The step S7D determines, a damping force required to suppress the vibration of the vehicle on the basis of the acceleration signal A from the acceleration sensor 201 (FIG. 25), as well as demand current (command current) $I_0$ for obtaining the applied current I having a magnitude required to generate the damping force.

The step S7D includes process steps shown in FIG. 25. The process steps shown in FIG. 25 differ from those shown in FIG. 8 in the point that a velocity conversion block ⑤ is interposed between the block ① and the block ②. In the velocity conversion block ⑤, the velocity V from the block ① is converted into velocity V' substantially proportional to the velocity V and the converted result is outputted to the block ②. In this case, when a value of sprung-mass velocity V is smaller than a predetermined value (for example, $Q_a$), the velocity V' is set to zero (0). A range where the value of the sprung-mass velocity V is smaller than the predetermined value is referred to as "control dead zone Q" hereinafter. The control dead zone Q can be adjusted. The control dead zone Q is previously set to a control dead zone $Q_1$, and, as will be described later, the control dead zone Q can be set to a control dead zone $Q_2$ ($Q_2 > Q_1$) having a wider range than the control dead zone $Q_1$.

Figure 24:
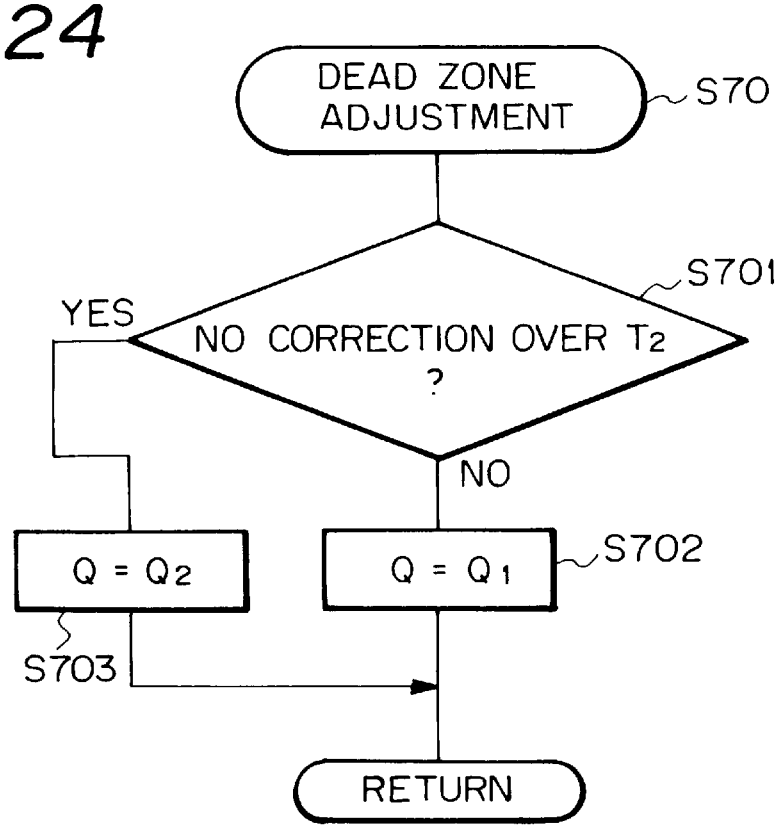
FIG. 24 is a flow chart showing a dead zone adjusting sub-routine in the flow chart of FIG. 23.

As shown in FIG. 24, in the dead zone adjusting sub-routine, first of all, it is judged whether the correction is not performed over a time period $T_2$ [$T_2 > T_1$ (refer to FIG. 21)] (step S701). In the step S701, if the correction is finished within the time period $T_2$, it is judged as NO, and the control dead zone Q is set to the control dead zone $Q_1$ (step S702).

On the other hand, in the step S701, if the correction is not performed over the time period $T_2$, it is judged as YES, and the control dead zone Q is set to the control dead zone $Q_2$ (step S702).

As mentioned above, by changing the control dead zone Q to the control dead zone $Q_1$ in the velocity conversion block ⑤, the velocity component in the control dead zone $Q_1$ is eliminated. Thus, from the block ③, as shown in a middle part in FIG. 26, the demand current $I_0$ is outputted in such a way that the control dead zone $Q_1$ is regarded as a reference value.

By adjusting the control dead zone Q to the control dead zone $Q_2$, in the velocity conversion block ⑤, the velocity component in the control dead zone $Q_2$ is eliminated. Thus, from the block ③, as shown in a lower part in FIG. 26, the demand current $I_0$ is outputted in such a way that the control dead zone $Q_2$ is regarded as a reference value.

The reference value is set to a current value (between the curves ① and ② for both expansion and compression strokes) for maintaining the steering stability without worsening the riding comfort, i.e., for providing a medium damping force (for both expansion and compression strokes).

In the suspension control apparatus having the above-mentioned arrangement, if the correction is not performed over the time period $T_2$, since it is judged as YES and the control dead zone Q is set to the control dead zone $Q_2$, the following function and effect can be achieved. In order to explain such function and effect, explanation is made in comparison with a case where the control dead zone Q is set to the control dead zone $Q_1$ and is not changed.

Figure 26:
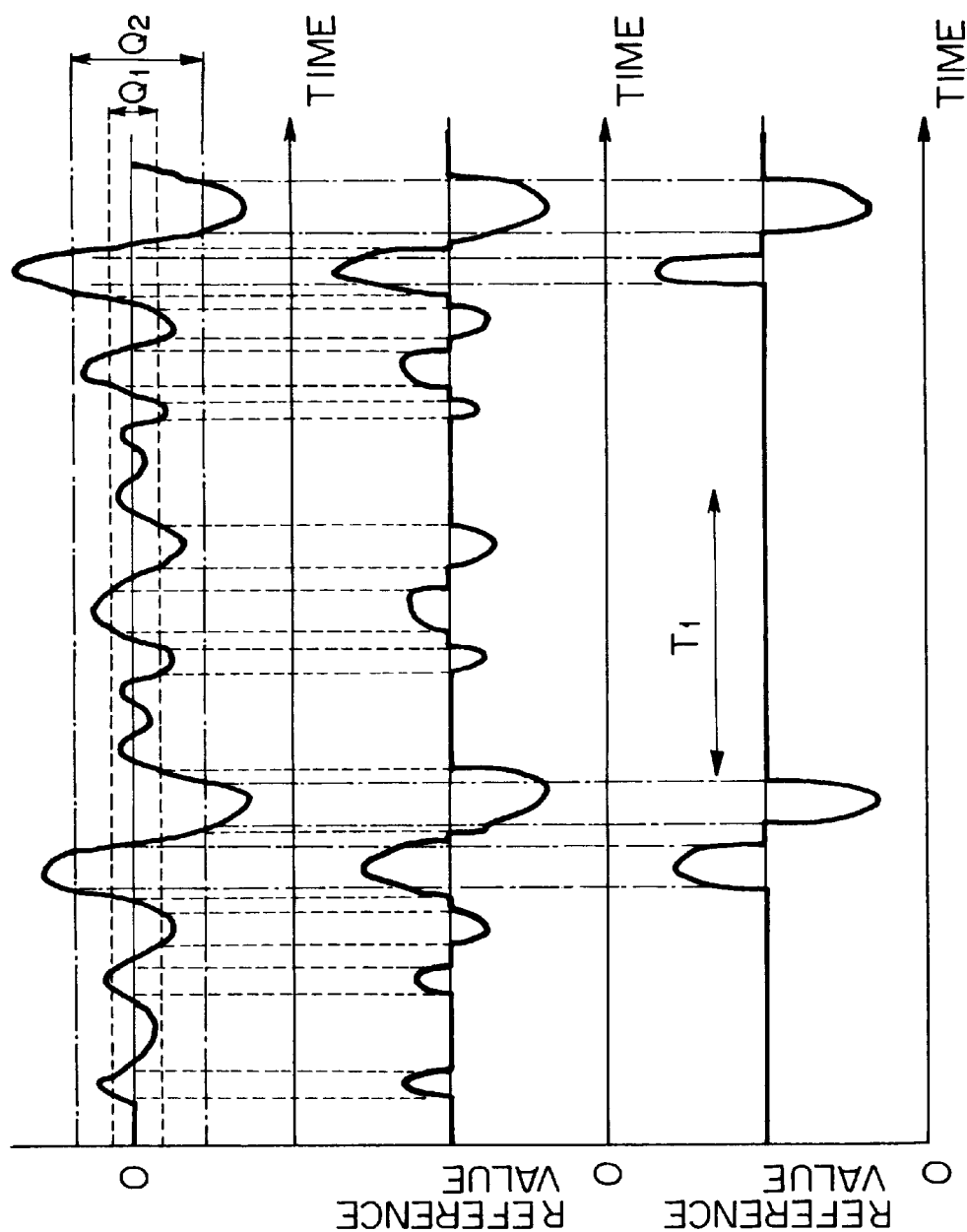
FIG. 26 is a graph showing wave forms for explaining the operation of the suspension control apparatus according to the sixth embodiment.

First of all, in the case where the control dead zone Q is set to the control dead zone $Q_1$ and is not changed, when the vehicle is running on an uneven road, for example, as shown in the upper and middle parts of FIG. 26, the magnitude of the demand current $I_0$ is frequently changed in a short time. Thus, it is hard to output the same demand current $I_0$ over the given time period $T_1$. In this case, it is judged as NO in the step S61 of FIG. 21, the treatments in the steps S64 and S65 are executed without executing the treatments in the steps S62 and S63 (i.e., without correction). If the treatments (i.e., correction treatment) in the steps S62 and S63 are not executed in this way, deviation between the actual actuator current and the demand current $I_0$ will be increased. As a result, there is a danger of occurring the fact that the suspension control is not effected properly.

To the contrary, in the sixth embodiment, since the control dead zone Q is set to the control dead zone $Q_2$ (step S703) if the correction is not performed over the time period $T_2$ ("YES" in the step S701), even when the vehicle is running on the uneven road, as shown in the velocity conversion block ⑤ of FIG. 25, the sprung-mass velocity V can enter into the range of the control dead zone $Q_2$ more easily in comparison with the case where the control dead zone Q is set to the control dead zone $Q_1$.

Thus, for example, as shown in the upper and lower parts of FIG. 26, the command current $I_0$ having the reference value is continuously outputted, and, thus, the same demand current $I_0$ can easily be outputted over the given time period $T_1$. As a result, since there is a greater chance that it is judged as YES in the step S61 of FIG. 21 and the treatments (i.e., correction treatment) in the steps S62 and S63 are frequently executed, and the deviation between the actual actuator current and the demand current $I_0$ is reduced, the proper suspension control is thereby ensured, and, thus, the riding comfort is improved.

In the above-mentioned embodiments, while an example that the damping force is adjusted is explained, the present invention is not limited to such an example, but may be applied to a vehicle height adjusting apparatus as disclosed in the Japanese Utility Model Application Laid-open No. 2-96302 (1990). Particularly, such an apparatus comprises a proportional solenoid valve including a solenoid and a movable member shiftable in proportion to current applied to the solenoid and adapted to adjust a flow rate of hydraulic fluid in response to the displacement of the movable member, a suspension body disposed between a vehicle chassis and a vehicle wheel for expansion and compression and capable of being expanded and compressed in response to the operation of the proportional solenoid valve, and a current supply circuit for supplying current to the solenoid. The present invention can be applied to current control for such a proportional solenoid valve.

According to the suspension control apparatus of the present invention, since the current actually flowing through the solenoid is measured and the duty ratio of the PWM signal is adjusted to obtain the desired damping force or compression amount on the basis of the comparison result between the measured current and the reference data, if the temperature of the solenoid is increased to increase the resistance thereof due to the application of current to the solenoid, the applied current is corrected to provide the desired damping force or compression amount, thereby achieving the highly accurate suspension control, and, thus, improving the riding comfort and steering stability. In the control apparatus, since the PWM signal having 100% duty ratio is outputted by the PWM signal generating circuit and the current is detected by the current detecting means, the creation of reference data to be compared with the current data from the current sensor is simplified, and, thus, the reference data can easily be obtained.

By correcting the applied current after the current flowing through the solenoid becomes constant, the duty ratio corresponding to the desired damping force can surely be set accurately. Therefore, suspension control is improved accordingly.

By providing the controller for correcting the command current value to the reference value when the magnitude of the command current to be supplied to the solenoid is small to fall in a control dead zone of a predetermined range and for increasing the range of the control dead zone when the correction is not performed for a given time period, there is a greater chance that the command current is continuously maintained to the reference value for a long time. Thus, by applying the present invention to a suspension control apparatus of the type wherein the command current is corrected when the command current is kept constant for a given time period, since the command current is apt to be kept constant (reference value) for a given time period or more, the deviation between the actual actuator current and the command current is reduced, thereby ensuring the proper suspension control accordingly, and, thus, improving the riding comfort.

We claim:

1. A suspension control apparatus for use with a vehicle having a vehicle body and a vehicle axle, said suspension control apparatus comprising:

an actuator having a solenoid and a movable member capable of being displaced in proportion to current applied to said solenoid and operable to adjust an amount of fluid passed through said actuator in response to a displacement of said movable member;

a current supply circuit operable to supply current to said actuator; and a shock absorber to be disposed between the vehicle body and the vehicle axle for expansion and compression and operable to adjust a condition of said shock absorber in response to operation of said actuator, wherein:

said current supply circuit comprises a power source connected to said solenoid, a PWM signal generating circuit of variable duty ratio type operable to output a PWM signal to said actuator, a switch incorporated in a closed circuit including said solenoid and said power source and capable of being opened or closed in response to a level of the PWM signal, a current detector operable to detect the current flowing through said solenoid, and a controller operable to adjust the duty ratio of the PWM signal on the basis of a comparison between the current detected by said current detector and a previously set reference data to correct the current flowing through said solenoid, and said controller is operable to cause said PWM signal generating circuit to output a PWM signal having a 100% duty ratio when said current detector detects the current and during the comparison between the current detected by said current detector and the previously set reference data.

2. A suspension control apparatus according to claim 1, wherein the condition of said shock absorber capable of being adjusted in response to operation of said actuator is a magnitude of damping force provided by said shock absorber.

3. A suspension control apparatus according to claim 2, wherein said controller is operable to correct the current after the current flowing through said solenoid becomes constant.

4. A suspension control apparatus according to claim 3, wherein said controller is operable to correct a magnitude of the command current to a reference value when the command current is in a control dead zone where the magnitude of the command current to be supplied to said solenoid is smaller than a previously set predetermined value, and to increase the range of the control dead zone when a correction to the magnitude of the command current is not effected for a predetermined time period.

5. A suspension control apparatus according to claim 1, wherein the condition of said shock absorber capable of being adjusted in response to operation of said actuator is a length of said shock absorber.

6. A suspension control apparatus according to claim 5, wherein said controller is operable to correct the current after the current flowing through said solenoid becomes constant.

7. A suspension control apparatus according to claim 6, wherein said controller is operable to correct a magnitude of the command current to a reference value when the command current is in a control dead zone where the magnitude of the command current to be supplied to said solenoid is smaller than a previously set predetermined value, and to increase the range of the control dead zone when a correction to the magnitude of the command current is not effected for a predetermined time period.

8. A suspension control apparatus according to claim 1, wherein said controller is operable to correct the current after the current flowing through said solenoid becomes constant.

9. A suspension control apparatus according to claim 8, wherein said controller is operable to correct a magnitude of the command current to a reference value when the command current is in a control dead zone where the magnitude of the command current to be supplied to said solenoid is smaller than a previously set predetermined value, and to increase the range of the control dead zone when a correction to the magnitude of the command current is not effected for a predetermined time period.

10. A suspension control apparatus according to claim 1, wherein said controller is operable to correct the current after the current flowing through said solenoid becomes constant.

11. A suspension control apparatus according to claim 10, wherein said controller is operable to correct a magnitude of the command current to a reference value when the command current is in a control dead zone where the magnitude of the command current to be supplied to said solenoid is smaller than a previously set predetermined value, and to increase the range of the control dead zone when a correction to the magnitude of the command current is not effected for a predetermined time period.

* * * * *